(12) United States Patent
 Sakashita

(10) Patent No.: US 11,881,798 B2
(45) Date of Patent: Jan. 23, 2024

(54) MOTOR DRIVE CONTROL APPARATUS

(71) Applicant: HITACHI ASTEMO, LTD., Hitachinaka (JP)

(72) Inventor: Tomio Sakashita, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/784,066

(22) PCT Filed: Dec. 7, 2020

(86) PCT No.: PCT/JP2020/045502
§ 371 (c)(1),
(2) Date: Jun. 9, 2022

(87) PCT Pub. No.: WO2021/117683
PCT Pub. Date: Jun. 17, 2021

(65) Prior Publication Data
US 2023/0038938 A1 Feb. 9, 2023

(30) Foreign Application Priority Data
Dec. 11, 2019 (JP) .................................. 2019-223590

(51) Int. Cl.
*H02P 23/14* (2006.01)
*H02P 25/22* (2006.01)

(52) U.S. Cl.
CPC .............. *H02P 23/14* (2013.01); *H02P 25/22* (2013.01)

(58) Field of Classification Search
CPC . H02P 23/14; H02P 25/22; H02P 5/74; B62D 5/0484; B62D 5/049
(Continued)

(56) References Cited

U.S. PATENT DOCUMENTS 10,205,416 B2* 2/2019 Furukawa ............... H02P 29/00
10,322,748 B2* 6/2019 Yanagi ...................... H02P 6/04
(Continued)

FOREIGN PATENT DOCUMENTS

| JP | 2004-276833 A | 10/2004 |
| JP | 2018-077096 A | 5/2018 |
| WO | WO-2019/176316 A1 | 9/2019 |

OTHER PUBLICATIONS

International Search Report dated Feb. 2, 2021 issued in International Application No. PCT/JP2020/045502, with English translation, 5 pages.
(Continued)

*Primary Examiner* — David Luo
(74) *Attorney, Agent, or Firm* — FOLEY & LARDNER LLP

(57) ABSTRACT

A motor drive control apparatus includes energization systems for energizing a motor having a plurality of independent winding sets, with the energization systems corresponding one-to-one to the winding sets. A plurality of sensors is provided for each of the energization systems. A controller is provided for each of the energization systems and controls energization of the corresponding winding set based on output signals of the corresponding sensors. A plurality of sub power supply paths is provided for their respective energization systems. Each sub power supply path connects a power supply path for supplying power to the corresponding sensors and a power supply path in another energization system. A semiconductor switch is provided for each of the sub power supply paths, and, between two different energization systems, when one of the two energization systems exhibits a sensor power supply failure, electrically connects the power supply paths of these two energization systems.

12 Claims, 11 Drawing Sheets

(58) Field of Classification Search
USPC .................................................. 318/445, 34
See application file for complete search history.

(56) References Cited

U.S. PATENT DOCUMENTS

| | | | |
|---|---|---|---|
| 10,821,967 B2* | 11/2020 | Murata | ................. H02P 29/024 |
| 2020/0406963 A1 | 12/2020 | Nakada et al. | |

OTHER PUBLICATIONS

International Preliminary Report on Patentability dated Jun. 23, 2022 issued in International Application No. PCT/JP2020/045502, with English translation, 13 pages.

* cited by examiner

MOTOR DRIVE CONTROL APPARATUS

TECHNICAL FIELD

The present invention relates to a motor drive control apparatus that controls the driving of a motor.

BACKGROUND ART

There is known a motor drive control apparatus that includes a plurality of independent energization systems for energizing a motor, and each energization system performs its energization control individually. This motor drive control apparatus performs a limp home operation such that, even if an abnormality occurs in one energization system, another normal energization system can continue the energization control (for example, see Patent Document 1). This motor drive control apparatus includes three sensors for detecting the rotation angle of a motor in the individual energization system. If one of the sensors outputs a sensor output signal that deviates from the other two sensors, the motor drive control apparatus determines that this one sensor is abnormal and continues the electrical control by using the other normal sensors, whereby reliability of the motor drive control is improved.

REFERENCE DOCUMENT LIST

Patent Document

Patent Document 1: JP2018-77096A

SUMMARY OF THE INVENTION

Problem to be Solved by the Invention

However, if a failure occurs in the power supplied to the sensors in one energization system, since the output signals of the sensors in this energization system stop, the continuation of the energization control becomes difficult, and therefore, the reliability of the motor drive control may deteriorate. In addition, use of more sensors in each energization system not only increases the cost, but also requires more space for these sensors and increases the size of the circuit.

The present invention has thus been made in view of the above problems, and it is an object of the present invention to provide a motor drive control apparatus that achieves improved reliability in its motor drive control without increasing the number of existing sensors.

Means for Solving the Problem

To this end, in an aspect of the present invention, a motor drive control apparatus including energization systems for energizing a motor having a plurality of independent winding sets, with the energization systems corresponding one-to-one to the winding sets, includes: a plurality of sensors which is provided for each of the energization systems and which detects physical amounts relating to driving control of the motor; a controller which is provided for each of the energization systems and which controls energization of the corresponding winding set based on output signals of the corresponding sensors; a power supply path which is provided for each of the energization systems and which supplies power to the corresponding sensors; a plurality of sub power supply paths, each of which mutually connects the power supply paths of the energization systems; and a semiconductor switch which is provided for each of the sub power supply paths and which, between two different energization systems, when a first energization system exhibits an abnormality indicating a drop in a voltage of the power supply supplied to the corresponding sensors, electrically connects the power supply path in the first energization system with the power supply path in a second energization system.

In addition, in another aspect of the present invention, a motor drive control apparatus including energization systems for energizing a motor having a plurality of independent winding sets, with the energization systems corresponding one-to-one to the winding sets, includes: a plurality of sensors which is provided for each of the energization systems and which detects physical amounts relating to driving control of the motor; and a controller which is provided for each of the energization systems and which controls energization of the corresponding winding set based on output signals of the corresponding sensors, wherein the controller in one of the energization systems receives at least one output signal of the sensors in another energization system different from the one energization system.

Effects of the Invention

The motor drive control apparatus according to the present invention makes it possible to improve reliability in motor drive control without increasing the number of existing sensors.

MODE FOR CARRYING OUT THE INVENTION

Hereinafter, examples of the present invention will be described in detail with reference to the attached drawings.

Shared Configuration in Electric Steering System

Figure 1:
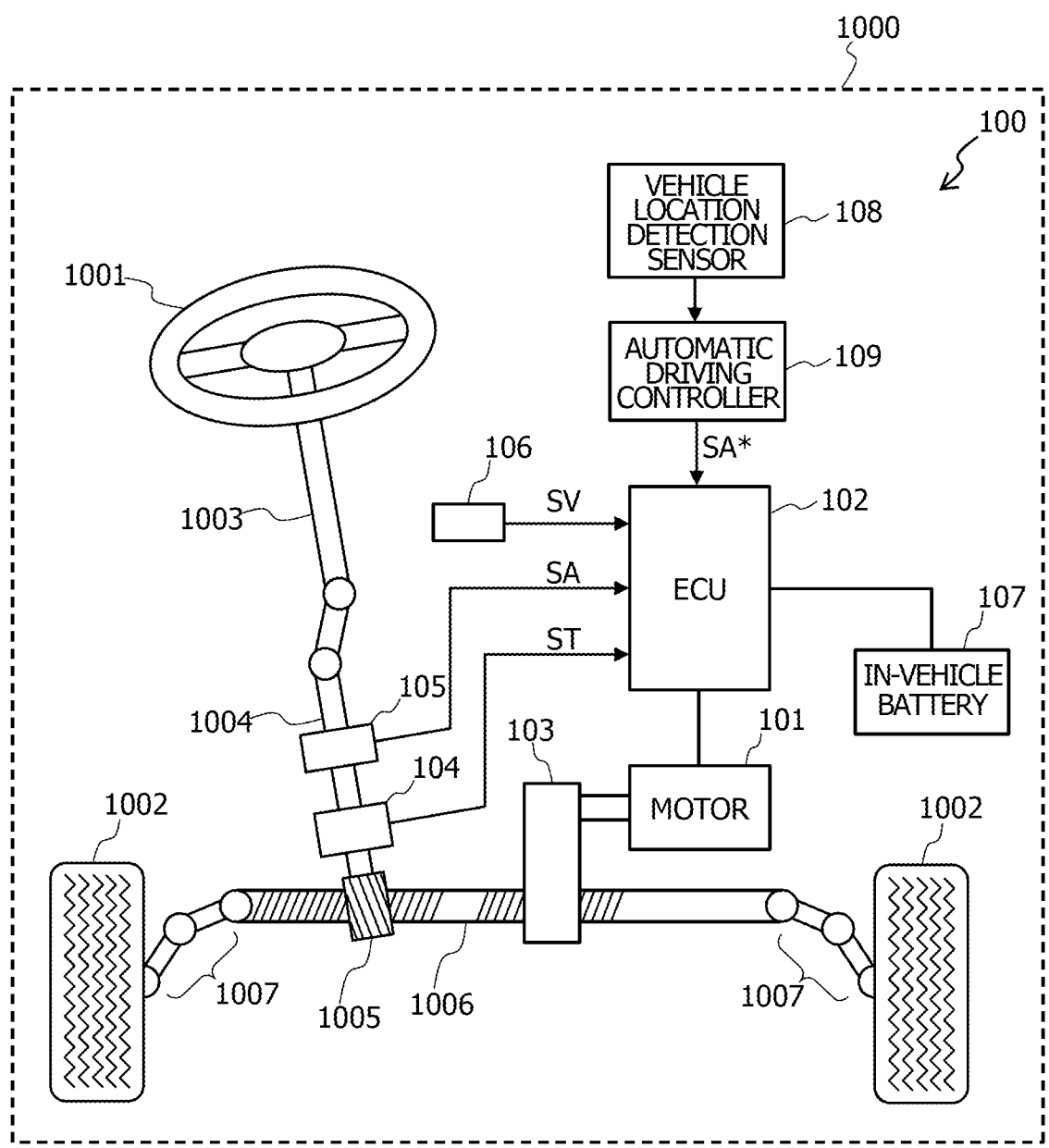
FIG. 1 schematically illustrates an example of an electric steering system.

FIG. 1 illustrates an example of an electric steering system to which a motor drive control apparatus is applied. An electric steering system 100 has at least one of the following two functions, namely, a manual driving function required for a manual driving in which a driver of a vehicle 1000 performs steering operation and an automatic or semi-automatic driving function required for an automatic or semi-automatic driving of the vehicle 1000.

When electric steering system 100 is used as the manual driving function to turn wheels-to-be-steered 1002 with steering torque generated by operating a steering wheel 1001, electric steering system 100 assists the steering torque.

The steering torque generated by operating steering wheel 1001 is transmitted to a pinion gear 1005 connected to a pinion shaft 1004 via a steering shaft 1003, etc. The rotational motion of pinion gear 1005 based on the transmitted steering torque is converted into a linear motion in the direction of the vehicle width by a rack gear 1006 that engages with pinion gear 1005. With this linear motion, a tie rod pair 1007 connected to rack gear 1006 operates, and consequently, wheels-to-be-steered 1002 connected one-to-one to tie rods 1007 turn. Electric steering system 100 is configured to add assist torque which assists the steering torque to the steering torque transmission path from steering wheel 1001 to tie rod pair 1007.

In the example illustrated in FIG. 1, electric steering system 100 includes a motor 101 which generates the assist torque, and an electric steering control apparatus (hereinafter referred to as an "ECU") 102 which functions as a motor drive control apparatus controlling the driving of motor 101. In addition, electric steering system 100 includes a reducer 103 which reduces the speed of motor 101 and transmits to rack gear 1006 the output with reduced speed. The electric steering system 100 also includes a steering torque sensor 104 which measures the steering torque, a steering angle sensor 105 which measures the steering angle, and a vehicle velocity sensor 106 which measures the vehicle velocity.

ECU 102 receives power from an in-vehicle battery 107 and receives a steering torque signal ST which is the output signal of steering torque sensor 104, a steering angle signal SA which the output signal of steering angle sensor 105, and a vehicle velocity signal SV which is the output signal of vehicle velocity sensor 106. ECU 102 detects the steering angle, the steering torque, and the vehicle velocity from various received signals and calculates a target steering torque value (target torque) based on these physical amounts. Next, ECU 102 performs its motor drive control such that the actual steering torque detected from steering torque signal ST will be approximated to the target torque. The torque generated by motor 101 is transmitted to rack gear 1006 via reducer 103, and consequently, the steering torque is assisted depending on the driving state of vehicle 1000.

Electric steering system 100 is uses as the automatic or semi-automatic (autonomical or semi-autonomical) driving function of vehicle 1000 to automatically turn wheels-to-be-steered 1002. Thus, electric steering system 100 further includes a vehicle location detection sensor 108 and an automatic driving controller 109. Vehicle location detection sensor 108 is, for example, an in-vehicle sensor for detecting the location of the vehicle 1000, such as a global positioning system (GPS) sensor, a camera, or a millimeter-wave radar. Automatic driving controller 109 is configured to calculate the target steering angle of steering wheel 1001 based on the location detected by vehicle location detection sensor 108 and to output a steering angle command signal SA* including information about the target steering angle upon receiving a request for the automatic driving of vehicle 1000. ECU 102 receives steering angle command signal SA* from automatic driving controller 109 and calculates the target steering torque value (target torque) based on the deviation of the actual steering angle, which has been detected from steering angle detection signal SA, from the target steering angle, which has been detected from this steering angle command signal SA*. Next, ECU 102 controls the driving of motor 101 such that the actual steering torque detected from steering torque detection signal ST will be approximated to the target torque. The torque generated by motor 101 is transmitted to rack gear 1006 via reducer 103, and consequently, wheels-to-be-steered 1002 are automatically turned.

Figure 2:
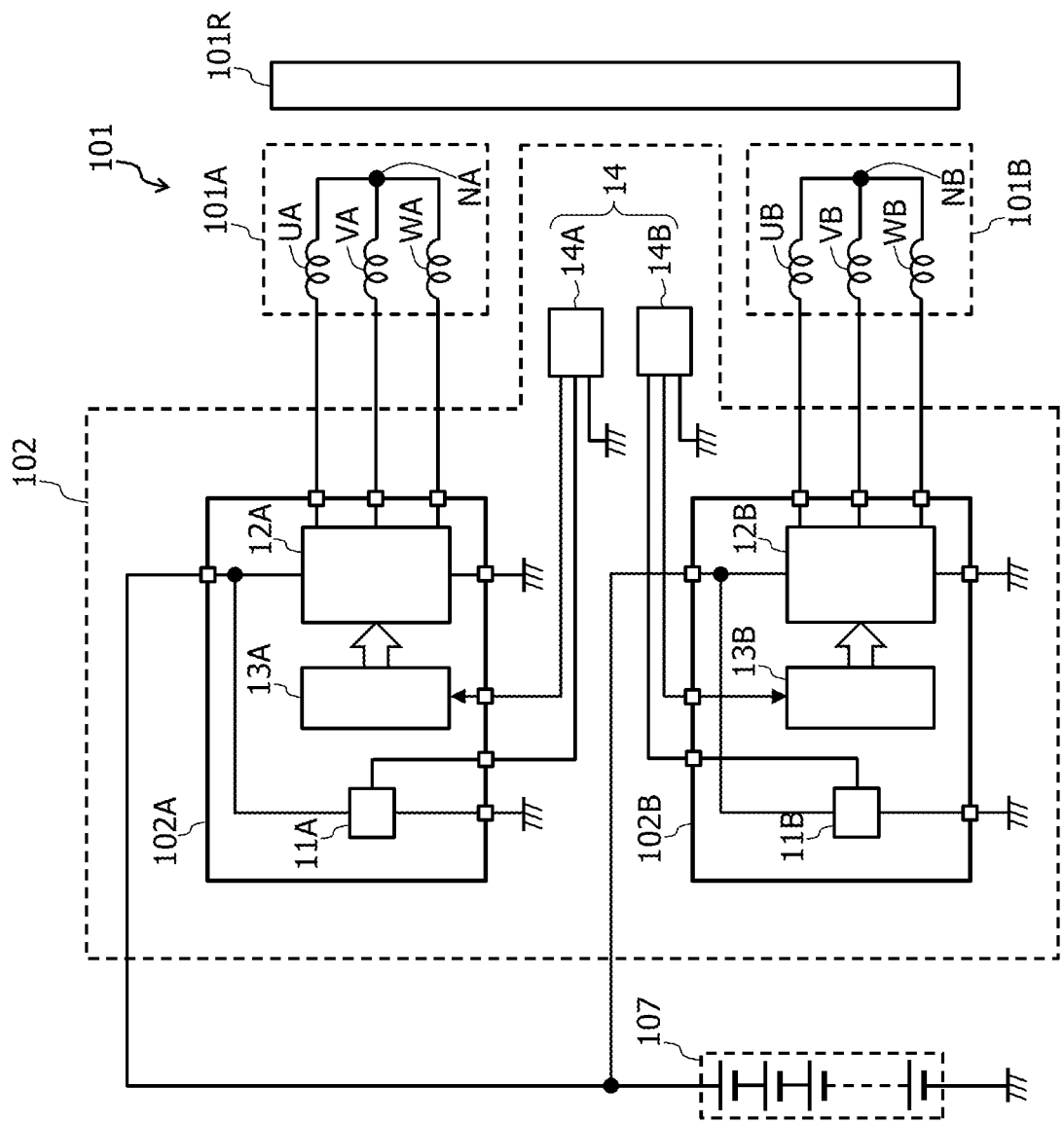
FIG. 2 is a circuit diagram illustrating an example of a redundant configuration of energization systems for a motor.

FIG. 2 illustrates an example of a redundant configuration of energization systems for energizing motor 101 in electric steering system 100. Electric steering system 100 includes two independent energization systems which are a first energization system and a second energization system, from in-vehicle battery 107 to motor 101, and each energization system performs its energization control individually. When one of the energization systems exhibits an abnormality, electric steering system 100 continues the electrical control by using the other normal energization system. That is, electric steering system 100 is able to perform a limp home operation. In the present description, an individual component included in the first energization system will be denoted by a reference numeral including an "A", and an individual component included in the second energization system will be denoted by a reference numeral including a "B". Two separate in-vehicle batteries 107 may be used for the first energization system and the second energization system so that the limp home operation can be performed more reliably.

Motor 101 is a three-phase brushless motor and includes an approximately cylindrical stator (not illustrated) including two electrically separated winding sets of a first winding set 101A and a second winding set 101B. In addition, motor 101 includes a permanent magnet rotor as a rotor 101R which is installed rotatably around the shaft line of the stator in the middle part thereof. The electrical control on first winding set 101A is performed in the first energization system, and first winding set 101A is formed by three-phase windings (stator coils) in which a U-phase coil UA, a V-phase coil VA, and a W-phase coil WA are all connected (Y-connected) at a neutral point NA. In addition, the electrical control on second winding set 101B is performed in the second energization system, and second winding set 101B is formed by three-phase windings in which a U-phase coil UB, a V-phase coil VB, and a W-phase coil WB are all connected (Y-connected) at a neutral point NB. First winding set 101A and second winding set 101B are insulated from each other, are wound around the stator, and share a magnetic circuit.

ECU 102 includes a rotation angle detection unit 14 including a plurality of rotation angle sensors for detecting the rotation angle of rotor 101R (hereinafter, "rotor rotation angle"). The rotation angle detection unit 14 is divided into a first rotation angle sensor group 14A and a second rotation angle sensor group 14B. First rotation angle sensor group 14A includes a plurality of rotation angle sensors used for the electrical control in the first energization system. Second rotation angle sensor group 14B includes a plurality of rotation angle sensors used for the electrical control in the second energization system. The rotation angle sensors are not particularly limited to any type of sensors. For example, sensors for various detection methods that need a power supply may be used, and examples of the sensors include Hall elements, resolvers, and rotary encoders.

In addition, ECU 102 includes a controller for each of the first energization system and the second energization system. The individual controller performs the electrical control in the corresponding energization system based on the output signals of the corresponding rotation angle sensors. That is, the individual controller controls the amount of energization to the winding set in the corresponding energization system. Specifically, ECU 102 includes a first energization controller 102A that controls the amount of energization to first winding set 101A in the first energization system and includes a second energization controller 102B that controls the amount of energization to second winding set 101B in the second energization system. First energization controller 102A includes a first power supply circuit 11A, a first drive circuit 12A, and a first control circuit 13A. In addition, second energization controller 102B includes a second power supply circuit 11B, a second drive circuit 12B, and a second control circuit 13B.

First power supply circuit 11A provides a sensor power supply to the individual sensor in first rotation angle sensor group 14A by adjusting the power supply voltage of in-vehicle battery 107. Second power supply circuit 11B provides a sensor power supply to the individual sensor in second rotation angle sensor group 14B by adjusting the power supply voltage of in-vehicle battery 107. The power supplies for the sensors in the two energization systems, that is, for the sensors in first rotation angle sensor group 14A and the sensors in second rotation angle sensor group 14B, have approximately the same voltage. Although not illustrated, a power supply circuit provided in the first energization system separately from first power supply circuit 11A provides a power supply to first control circuit 13A, and a power supply circuit provided in the second energization system separately from second power supply circuit 11B provides a power supply to second control circuit 13B.

Each of first drive circuit 12A and second drive circuit 12B includes a three-phase bridge circuit connected between the positive electrode and the negative electrode of in-vehicle battery 107. In first drive circuit 12A, two switching elements are connected in series with each other for each phase of first winding set 101A, and these pairs of switching elements are connected in parallel with each other between the positive electrode and the negative electrode of in-vehicle battery 107. In first drive circuit 12A, the coil of an individual phase of first winding set 101A is connected to a point between the two switching elements of this phase. In addition, in second drive circuit 12B, two switching elements are connected in series with each other for each phase of second winding set 101B, and these pairs of switching elements are connected in parallel with each other between the positive electrode and the negative electrode of in-vehicle battery 107. In second drive circuit 12B, the coil of an individual phase of second winding set 101B is connected to a point between the two switching elements of this phase.

Each of the switching elements in first drive circuit 12A and second drive circuit 12B includes an externally controllable control electrode and performs a switching operation between an on-state and an off-state in accordance with a control signal input to its control electrode. Examples of the switching elements include semiconductor elements such as metal-oxide-semiconductor field-effect transistors (MOSFETs) and insulated gate bipolar transistors (IGBTs).

Each of first control circuit 13A and second control circuit 13B includes a computer, including a processor such as a central processing unit (CPU), a volatile memory such as a random access memory (RAM), a non-volatile memory such as a read-only memory (ROM), input-output ports, etc. The processor of each of first control circuit 13A and second control circuit 13B embodies various functions of ECU 102 such as the following energization control function by reading out and executing a program stored in a non-volatile memory. However, some or all of these functions of ECU 102 may be realized by a hardware configuration.

Each of first control circuit 13A and second control circuit 13B receives steering torque signal ST, steering angle signal SA, and vehicle velocity signal SV, detects steering torque, steering angle, and vehicle velocity from these input signals, and calculates the above target torque based on these physical amounts. Information about the target torque calculated by one control circuit may be output to the other control circuit via a communication line that mutually connects first control circuit 13A and second control circuit 13B.

Each of first control circuit 13A and second control circuit 13B calculates the energization amount of motor 101, to approximate the actual steering torque detected from steering torque detection signal ST to the target torque. Next, each of first control circuit 13A and second control circuit 13B multiplies the calculated energization amount of motor 101 by the energization ratio of the corresponding energization system, to calculate the corresponding energization amount. For example, each of first control circuit 13A and second control circuit 13B refers to a predetermined ratio (for example, 50%: 50%), such as a ratio between an upper limit of the energization amount from first drive circuit 12A to first winding set 101A and an upper limit of the energization amount from second drive circuit 12B to second winding set 101B. The energization ratio is stored in the non-volatile memory in each of first control circuit 13A and second control circuit 13B.

First control circuit 13A processes the output signal of any one of the plurality of rotation angle sensors in the first rotation angle sensor group 14A by using publicly known signal processing means and detects a rotor rotation angle. In addition, second control circuit 13B processes the output signal of any one of the plurality of rotation angle sensors in the second rotation angle sensor group 14B by using publicly known signal processing means and detects a rotor rotation angle.

In addition, first control circuit 13A performs the energization control on first winding set 101A based on the corresponding energization amount in the first energization system and the actual energization amount obtained by using the rotor rotation angle. In addition, second control circuit 13B performs the energization control on second winding set 101B based on the corresponding energization amount in the second energization system and the actual energization amount obtained by using the rotor rotation angle. Specifically, first control circuit 13A outputs a control signal based on the deviation of the actual energization amount from the corresponding energization amount in the first energization system to the switching elements in first drive circuit 12A. In addition, second control circuit 13B outputs a control signal based on the deviation of the actual energization amount from the corresponding energization amount in the second energization system to the switching elements in second drive circuit 12B. The control signal output from first control circuit 13A to first drive circuit 12A and the control signal output from second control circuit 13B to second drive circuit 12B may each be adjusted to a voltage suitable for the corresponding switching elements via a corresponding pre-driver.

First Example

Figure 3:
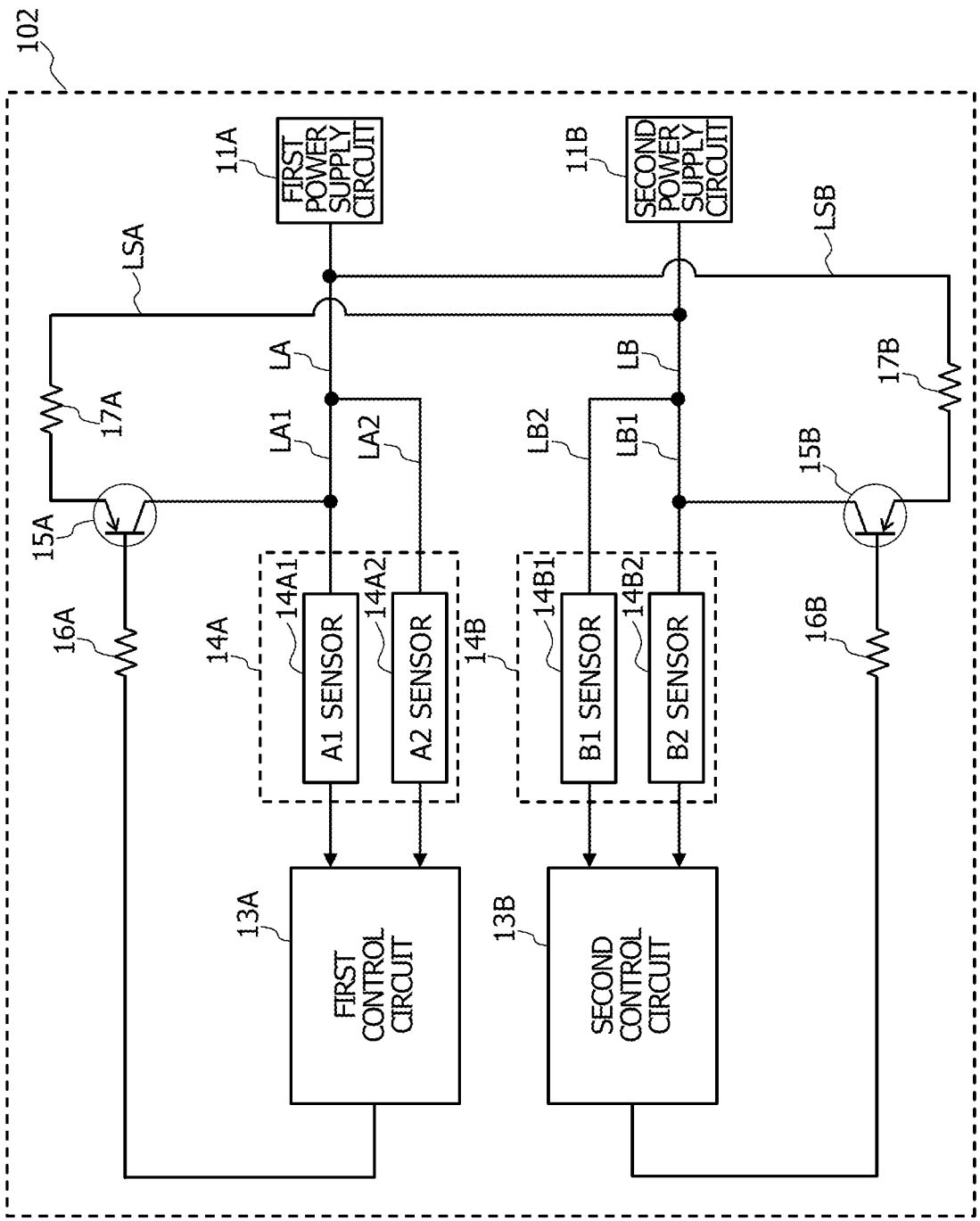
FIG. 3 illustrates details of a main part of an internal configuration example of a motor drive control apparatus according to a first example.

FIG. 3 illustrates details of a main part of an internal configuration of ECU 102 according to a first example. Specifically, FIG. 3 illustrates a connection mode of first rotation angle sensor group 14A, second rotation angle sensor group 14B, first control circuit 13A, second control circuit 13B, first power supply circuit 11A, and second power supply circuit 11B. The same connection mode is also illustrated in FIGS. 4 to 11.

First rotation angle sensor group 14A is formed by two rotation angle sensors, which are an A1 sensor 14A1 and an A2 sensor 14A2, and the output signals of these two rotation angle sensors, which are A1 sensor 14A1 and A2 sensor 14A2, are input to first control circuit 13A. A1 sensor 14A1 receives power from first power supply circuit 11A via a first shared power supply path LA and an A1 branch path LA1 branched therefrom, and A2 sensor 14A2 receives power from first power supply circuit 11A via first shared power supply path LA and an A2 branch path LA2 branched therefrom. First shared power supply path LA, A1 branch path LA1, and A2 branch path LA2 constitute a sensor power supply path in the first energization system for supplying power to A1 sensor 14A1 and A2 sensor 14A2.

Second rotation angle sensor group 14B is formed by two rotation angle sensors, which are a B1 sensor 14B1 and a B2 sensor 14B2, and the output signals of these two rotation angle sensors, which are B1 sensor 14B1 and B2 sensor 14B2, are input to second control circuit 13B. B1 sensor 14B1 receives power from second power supply circuit 11B via a second shared power supply path LB and a B1 branch path LB1 branched therefrom, and B2 sensor 14B2 receives power from second power supply circuit 11B via second shared power supply path LB and a B2 branch path LB2 branched therefrom. Second shared power supply path LB, B1 branch path LB1, and B2 branch path LB2 constitute a sensor power supply path in the second energization system for supplying power to B1 sensor 14B1 and B2 sensor 14B2.

If the power supplied to the rotation angle sensors in one energization system is lost or significantly drops (either of which will hereinafter be referred to as a "sensor power supply failure"), the output signals of the rotation angle sensors in this energization system stop, and continuation of electrical control becomes difficult. Thus, ECU 102 has an emergency power supply function of supplying, if a sensor power supply failure occurs in one energization system, a sensor power supply (emergency power supply) to this abnormal energization system from the other normal energization system.

Specifically, ECU 102 includes two sub power supply paths, each of which connects first shared power supply path LA, A1 branch path LA1, or A2 branch path LA2 and second shared power supply path LB, B1 branch path LB1, or B2 branch path LB2. In short, ECU 102 includes two sub power supply paths, each of which connects the sensor power supply path in the first energization system and the sensor power supply path in the second energization system. Between these two sub power supply paths, a first sub power supply path LSA is an emergency power supply path for supplying an emergency power supply to A1 sensor 14A1 and A2 sensor 14A2 in the first energization system from the second energization system when a sensor power supply failure occurs in the first energization system. In addition, between the two sub power supply paths, a second sub power supply path LSB is an emergency power supply path for supplying an emergency power supply to B1 sensor 14B1 and B2 sensor 14B2 in the second energization system from the first energization system when a sensor power supply failure occurs in the second energization system.

It is preferable that first sub power supply path LSA be connected such that an emergency power supply can be supplied to any one of the sensors in the first energization system even if the cause of a sensor power supply failure in the first energization system is an abnormality (a disconnection, a short circuit, or the like) of the sensor power supply path in the first energization system. Thus, first sub power supply path LSA may be connected to a point on the sensor power supply path in the first energization system, the point being near A1 sensor 14A1 or A2 sensor 14A2 as the destination node of the emergency power supply. In addition, it is preferable that second sub power supply path LSB be connected such that an emergency power supply can be supplied to any one of the sensors in the second energization system even if the cause of a sensor power supply failure in the second energization system is an abnormality of the sensor power supply path in the second energization system. Thus, second sub power supply path LSB may be connected to a point on the sensor power supply path in the second energization system, the point being near B1 sensor 14B1 or B2 sensor 14B2 as the destination node of the emergency power supply.

Near which one of A1 sensor 14A1 and A2 sensor 14A2 the first sub power supply path LSA needs to be connected and near which one of B1 sensor 14B1 and B2 sensor 14B2 the second sub power supply path LSB needs to be connected are determined as follows. That is, sensor characteristics, such as output format, output accuracy, and operating voltage range, of the four rotation angle sensors are compared with each other between the two energization systems. For example, if A1 sensor 14A1 and B2 sensor 14B2 have a wider operating voltage range than that of the other sensors, whereas the output format, etc., are the same as those of the other sensors, first sub power supply path LSA is connected near A1 sensor 14A1, and the second sub power supply path LSB is connected near B2 sensor 14B2, as illustrated in FIG. 3.

An externally controllable first semiconductor switch 15A is provided on first sub power supply path LSA, and the control terminal of first semiconductor switch 15A is connected to first control circuit 13A. When set to an on-state, first semiconductor switch 15A electrically connects the sensor power supply path in the first energization system with the sensor power supply path in the second energization system via first sub power supply path LSA. In addition, a second semiconductor switch 15B is provided on second sub power supply path LSB, and the control terminal of second semiconductor switch 15B is connected to second control circuit 13B. When set to an on-state, second semiconductor switch 15B electrically connects the sensor power supply path in the first energization system with the sensor power supply path in the second energization system via second sub power supply path LSB.

For example, bipolar transistors, field effect transistors (FETs), or the like may be used as first semiconductor switch 15A and second semiconductor switch 15B. In FIG. 3, PNP transistors are used as first semiconductor switch 15A and second semiconductor switch 15B. The base terminal of first semiconductor switch 15A, which is a PNP transistor, is connected to first control circuit 13A via a base resistor 16A, and the base terminal of second semiconductor switch 15B, which is also a PNP transistor, is connected to second control circuit 13B via a base resistor 16B.

A current-limiting resistor is provided on each of the sub power supply paths. The individual current-limiting resistor limits the corresponding emergency power supply current flowing to the corresponding sensor power supply path via the corresponding sub power supply path. Specifically, a first current-limiting resistor 17A is provided on first sub power supply path LSA and limits the emergency power supply current flowing to the sensor power supply path in the first energization system via first sub power supply path LSA. In addition, a second current-limiting resistor 17B is provided on second sub power supply path LSB and limits the emergency power supply current flowing to the sensor power supply path in the second energization system via second sub power supply path LSB.

If first control circuit 13A detects that at least one of the two output signals of A1 sensor 14A1 and A2 sensor 14A2 is stopped, first control circuit 13A determines that a sensor power supply failure has occurred in the first energization system. Next, first control circuit 13A outputs a control signal for setting first semiconductor switch 15A to an on-state (performs on-control). Consequently, first control circuit 13A can electrically connect the sensor power supply path in the first energization system with the sensor power supply path in the second energization system to each other via first sub power supply path LSA and can supply an emergency power supply to at least one of A1 sensor 14A1 and A2 sensor 14A2 in the first energization system from the second energization system.

In addition, if second control circuit 13B detects that at least one of the two output signals of B1 sensor 14B1 and B2 sensor 14B2 has stopped, second control circuit 13B determines that a sensor power supply failure has occurred in the second energization system and performs on-control of second semiconductor switch 15B. Consequently, second control circuit 13B can electrically connect the sensor power supply path in the second energization system with the sensor power supply path in the first energization system via second sub power supply path LSB and can supply emergency power supply to at least one of B1 sensor 14B1 and B2 sensor 14B2 in the second energization system from the first energization system.

The above emergency power supply function of ECU 102 can improve the continuity of the energization control in the energization system in which a sensor power supply failure has occurred. Thus, ECU 102 can improve the reliability of the motor drive control without increasing the number of existing sensors.

Second Example

Figure 4:
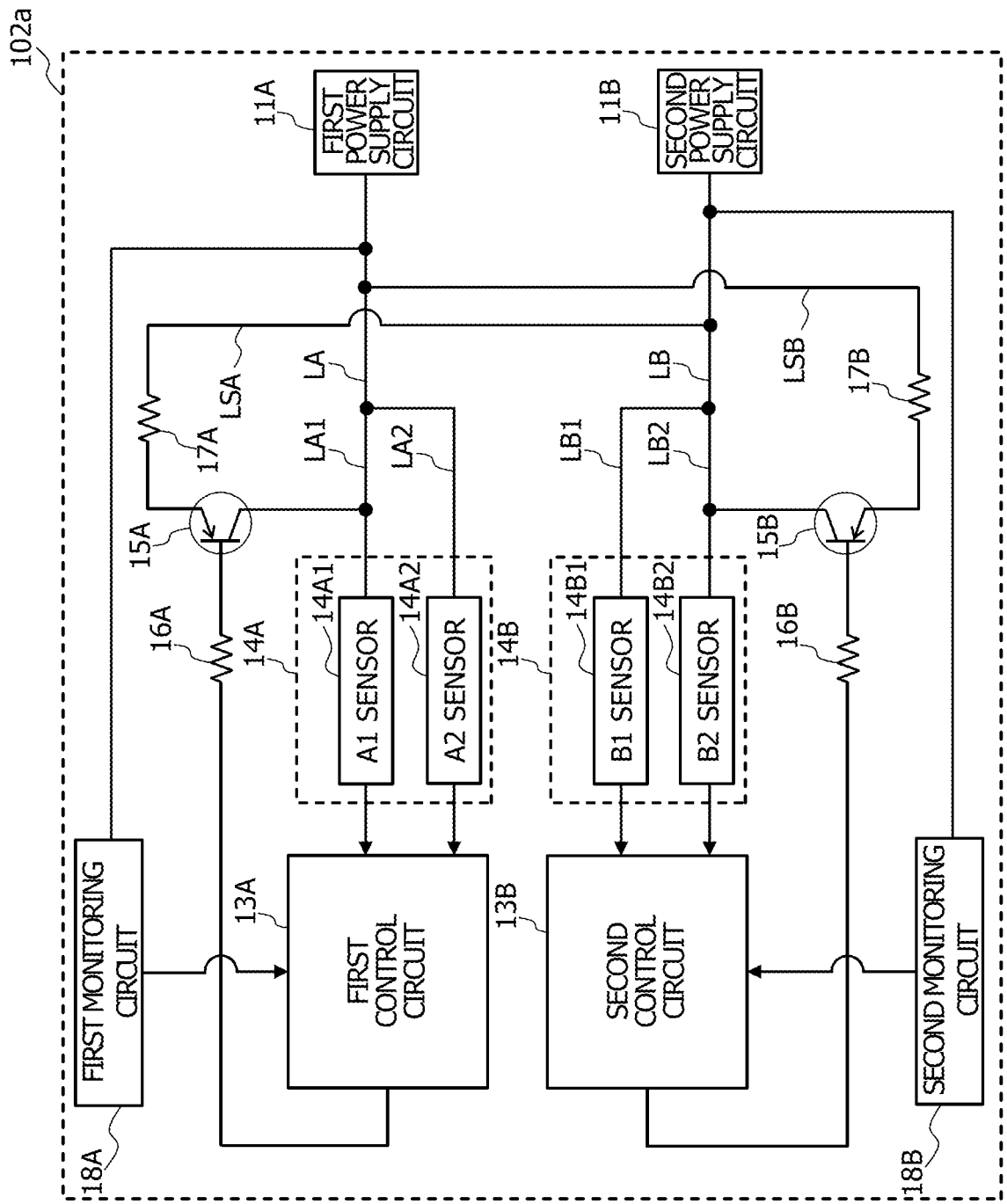
FIG. 4 illustrates details of a main part of an internal configuration example of a motor drive control apparatus according to a second example.

FIG. 4 illustrates details of a main part of an internal configuration of an ECU 102a according to a second example.

In the present example, what is different from the first example will mainly be described, and descriptions relating to the first example will be applied to the other part of the second example, as long as there is no conflict. Thus, the same components as those according to the first example will be denoted by the same reference characters, and description thereof will be omitted or simplified. The same applies to the third and fourth examples described below.

In ECU 102, if the control circuit in an individual energization system detects that at least one of the output signals of the corresponding rotation angle sensors has stopped, this control circuit determines that a sensor power supply failure has occurred. However, it is difficult for the control circuit in the individual energization system to determine whether the stoppage of the output signal of a rotation angle sensor is due to a sensor power supply failure or a malfunction of the rotation angle sensor itself. Thus, although the rotation angle sensor itself has malfunctioned, an emergency power supply could be supplied from the other energization system.

Thus, in each of the energization systems, ECU 102a includes a monitoring circuit that monitors the voltage of the corresponding sensor power supply path. A first monitoring circuit 18A that monitors the voltage of the sensor power supply path in the first energization system is connected to first control circuit 13A, and the output signal of first monitoring circuit 18A is input to first control circuit 13A. A second monitoring circuit 18B that monitors the voltage of the sensor power supply path in the second energization system is connected to second control circuit 13B, and the output signal of second monitoring circuit 18B is input to second control circuit 13B.

It is preferable that each of first monitoring circuit 18A and second monitoring circuit 18B be connected to its corresponding sensor power supply path such that a drop in the voltage of its corresponding sensor power supply path can be detected even when a sensor power supply failure in its monitoring target energization system is due to an abnormality such as a disconnection or a short circuit of its corresponding sensor power supply path in its corresponding energization system. Thus, first monitoring circuit 18A may be connected to a point near any one of A1 sensor 14A1 and A2 sensor 14A2 to which first sub power supply path LSA is connected. In addition, second monitoring circuit 18B may be connected to a point near any one of B1 sensor 14B1 and B2 sensor 14B2 to which second sub power supply path LSB is connected.

First control circuit 13A determines whether a sensor power supply failure has occurred based on the output signal of first monitoring circuit 18A, and second control circuit 13B determines whether a sensor power supply failure has occurred based on the output signal of second monitoring circuit 18B.

Specifically, if the output signal of the monitoring circuit connected to the control circuit in an energization system indicates a voltage value of the sensor power supply path in this energization system, this control circuit determines whether a sensor power supply failure has occurred as follows. That is, if the control circuit in an energization system determines that the voltage value of the sensor power supply path in this energization system is less than a predetermined value, the voltage value having been detected based on the output signal of the monitoring circuit connected to the control circuit, the control circuit determines that a sensor power supply failure has occurred. For example, if the voltage value of the sensor power supply path in the first energization system, the voltage value having been detected based on the output signal of first monitoring circuit 18A, is less than a predetermined value, first control circuit 13A determines that a sensor power supply failure has occurred. The predetermined value may be a lower limit voltage value of the sensor power supply path with which the control circuit can determine occurrence of a sensor power supply failure, and for example, may be a lower limit voltage value of the sensor power supply path with which the rotation angle sensors in the energization system can output a signal to the control circuit.

If the monitoring circuit connected to the control circuit in an energization system outputs an output signal indicating that the voltage value of the sensor power supply path in this energization system is less than the above predetermined value, this control circuit immediately determines that a sensor power supply failure has occurred. For example, if first monitoring circuit 18A outputs, to first control circuit 13A, an output signal indicating that the voltage value of the sensor power supply path in the first energization system is less than the above predetermined value, first control circuit 13A immediately determines that a sensor power supply failure has occurred.

In addition, if the control circuit in an energization system detects that the output signal of a rotation angle sensor is stopped even when the voltage value of the sensor power supply path in this energization system is greater than or equal to the predetermined value, the control circuit determines that the rotation angle sensor itself has malfunctioned. For example, if first control circuit 13A detects that at least one of the output signals of A1 sensor 14A1 and A2 sensor 14A2 is stopped even when first control circuit 13A detects that the voltage value of the sensor power supply path in the first energization system is greater than or equal to the predetermined value based on the output signal of first monitoring circuit 18A, first control circuit 13A determines that a malfunction has occurred in the rotation angle sensor of which the output signal has stopped.

If first control circuit 13A determines that a sensor power supply failure has occurred in the first energization system, first control circuit 13A performs on-control of first semiconductor switch 15A. Similarly, if second control circuit 13B determines that a sensor power supply failure has occurred in the second energization system, second control circuit 13B performs on-control of second semiconductor switch 15B.

As is the case with ECU 102, since ECU 102a includes an emergency power supply function, ECU 102a improves the reliability of the motor drive control without increasing the number of existing sensors. In addition, ECU 102a provides the following advantageous effect. That is, since ECU 102a monitors the voltage values of the sensor power supply paths in its energization systems, ECU 102a can distinguish a sensor power supply failure and a malfunction of a rotation angle sensor itself. Thus, when a rotation angle sensor itself is abnormal, there is no need to control first semiconductor switch 15A or second semiconductor switch 15B to supply an emergency power supply to the corresponding energization system, and therefore, processing load on first control circuit 13A and second control circuit 13B is reduced.

If an abnormality occurs in the power supplied to the control circuit in an energization system already experiencing a sensor power supply failure, this control circuit could stop functioning. When the probability of this is relatively high, ECU 102a may be configured as follows. That is, first control circuit 13A may be configured to receive the output signal of second monitoring circuit 18B and perform on-control of second semiconductor switch 15B if first control circuit 13A determines that a sensor power supply failure has occurred in the second energization system based on the output signal of second monitoring circuit 18B. In addition, second control circuit 13B may be configured to receive the output signal of first monitoring circuit 18A and perform on-control of first semiconductor switch 15A if second control circuit 13B determines that a sensor power supply failure has occurred in the first energization system based on the output signal of first monitoring circuit Third Example FIG. 5 illustrates details of a main part of an internal configuration of an ECU 102b according to a third example.

In ECU 102, when a control circuit determines that a sensor power supply failure has occurred in its energization system, the control circuit performs on-control of the corresponding semiconductor switch on the corresponding sub power supply path that supplies an emergency power supply from the other energization system to its energization system. ECU 102b is configured such that, when a sensor power supply failure occurs in an energization system, an emergency power supply is supplied from the other energization system to this energization system, without using the control circuit in this energization system.

To this end, ECU 102b further includes a first self-holding circuit CA that holds first semiconductor switch 15A in an off-state when there is no sensor power supply failure in the first energization system, and in an on-state when a sensor power supply failure occurs in the first energization system. In addition, ECU 102b further includes a second self-holding circuit CB that holds second semiconductor switch 15B in an off-state when there is no sensor power supply failure in the second energization system, and in an on-state when a sensor power supply failure occurs in the second energization system. Although not limited to any particular configuration, first self-holding circuit CA and second self-holding circuit CB may be configured as illustrated in FIG. 5, for example.

Figure 5:
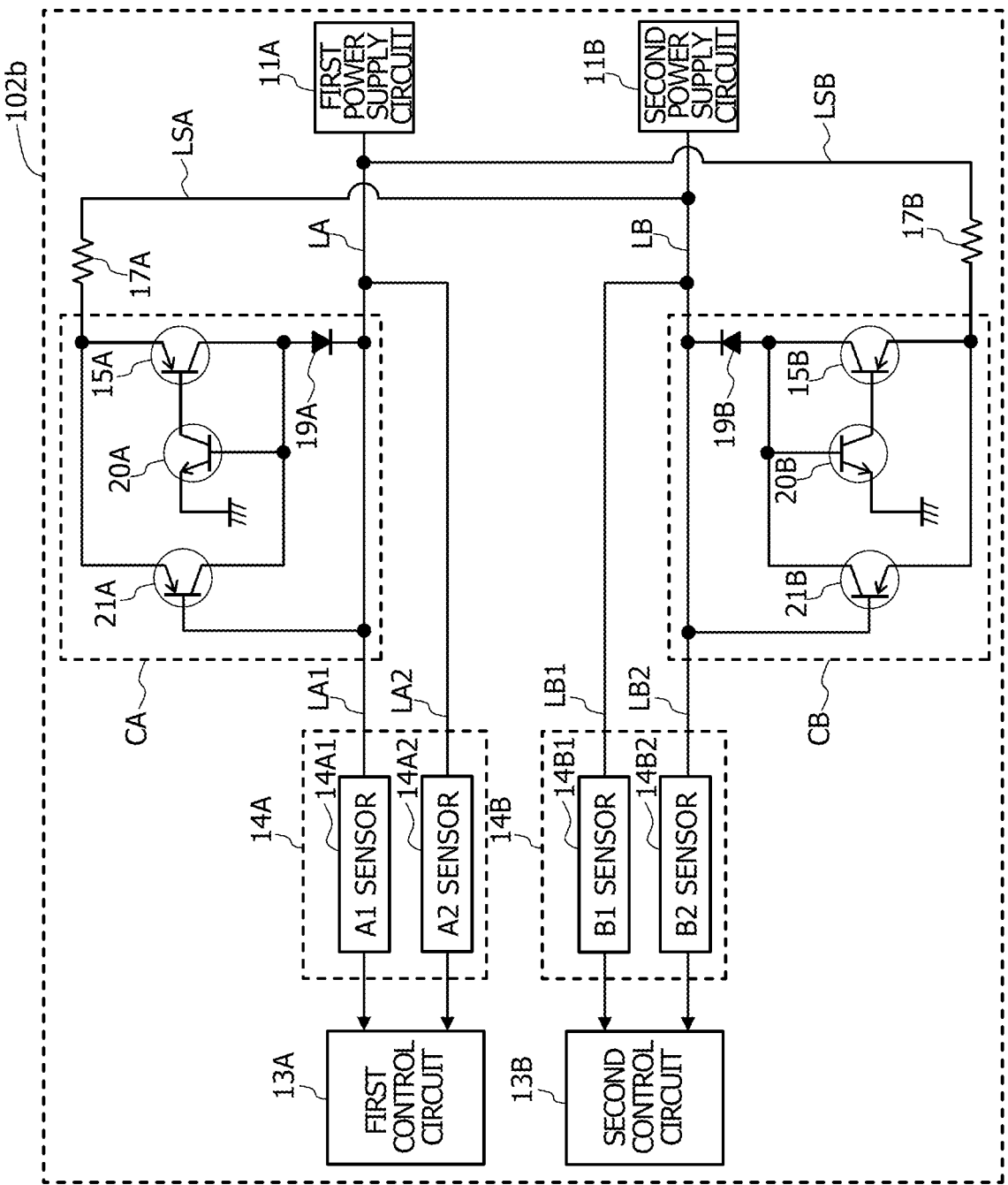
FIG. 5 illustrates details of a main part of an internal configuration example of a motor drive control apparatus according to a third example.

In FIG. 5, first self-holding circuit CA includes, first semiconductor switch 15A, which is a PNP transistor, a first self-holding circuit diode 19A, a first NPN transistor 20A, and a first PNP transistor 21A. First semiconductor switch 15A has an emitter terminal connected to the sensor power supply path in the second energization system and has a collector terminal connected to the sensor power supply path in the first energization system via first self-holding circuit diode 19A. First self-holding circuit diode 19A has an anode connected to the collector terminal of first semiconductor switch 15A and has a cathode connected to the sensor power supply path in the first energization system. First NPN transistor 20A has a collector terminal connected to the base terminal of first semiconductor switch 15A and has an emitter terminal connected to a ground. First PNP transistor 21A has a base terminal connected to the sensor power supply path in the first energization system and has an emitter terminal connected to first sub power supply path LSA between the emitter terminal of first semiconductor switch 15A and first current-limiting resistor 17A. The base terminal of first NPN transistor 20A and the collector terminal of first PNP transistor 21A are connected to first sub power supply path LSA between the collector terminal of first semiconductor switch 15A and the anode of first self-holding circuit diode 19A. For ease of description, illustration of various resistors for current limitation, etc. in first self-holding circuit CA and second self-holding circuit CB is omitted in FIG. 5.

In FIG. 5, as is the case with first self-holding circuit CA, second self-holding circuit CB includes second semiconductor switch 15B, which is a PNP transistor, a second self-holding circuit diode 19B, a second NPN transistor 20B, and a second PNP transistor 21B. That is, second semiconductor switch 15B corresponds to first semiconductor switch 15A, and second self-holding circuit diode 19B corresponds to first self-holding circuit diode 19A.

In addition, second NPN transistor 20B corresponds to first NPN transistor 20A, and second PNP transistor 21B corresponds to first PNP transistor 21A.

An operation of first self-holding circuit CA performed when there is no sensor power supply failure in the first energization system will be described. When there is no sensor power supply failure in the first energization system, since there is almost no potential difference between the base voltage and the collector voltage of first PNP transistor 21A, first PNP transistor 21A remains in an off-state. In addition, since first self-holding circuit diode 19A shuts off the current from the sensor power supply path in the first energization system to the base terminal of first NPN transistor 20A and first NPN transistor 20A remains in an off-state, first semiconductor switch 15A also remains in an off-state. Thus, when there is no sensor power supply failure in the first energization system, no emergency power supply is supplied from the second energization system to the first energization system via first sub power supply path LSA.

Next, an operation of first self-holding circuit CA performed when a sensor power supply failure occurs in the first energization system will be described. When a sensor power supply failure occurs in the first energization system, since the base voltage of first PNP transistor 21A significantly drops and a current flows from the emitter terminal to the base terminal, first PNP transistor 21A is set to an on-state. As a result, since the base voltage of first NPN transistor 20A rises and a current flows from the base terminal to the emitter terminal, first NPN transistor 20A is set to an on-state. As a result, since the base voltage of first semiconductor switch 15A significantly drops to a potential corresponding to a ground potential and a current flows from the emitter terminal to the base terminal, first semiconductor switch 15A is set to an on-state. In this way, the supply of an emergency power supply is started from the second energization system to the first energization system via first sub power supply path LSA.

When the supply of the emergency power supply from the second energization system to the first energization system via first sub power supply path LSA is started, the voltage of the sensor power supply path in the first energization system rises, and first PNP transistor 21A changes from an on-state to an off-state. However, since the base voltage of first NPN transistor 20A is not dropped by the collector voltage of first semiconductor switch 15A, which has already been set to an on-state, first NPN transistor 20A remains in an on-state. As a result, since the base voltage of first semiconductor switch 15A also remains at a potential corresponding to a ground potential, first semiconductor switch 15A remains in an on-state, and the supply of the emergency power supply from the second energization system to the first energization system via first sub power supply path LSA continues.

Since an operation of second self-holding circuit CB performed when there is no sensor power supply failure in the second energization system and an operation of second self-holding circuit CB performed when a sensor power supply failure occurs in the second energization system are the same as those of first self-holding circuit CA, description thereof will be omitted.

The configurations of first self-holding circuit CA and second self-holding circuit CB are not limited to the configuration examples illustrated in FIG. 5. Any configuration having the following function is applicable. That is, ECU 102b may have any configuration that maintains, when there is no sensor power supply failure in an energization system, corresponding semiconductor switch 15A or 15B provided on the sub power supply path for supplying an emergency power supply to the corresponding energization system in an off-state and that maintains, when a sensor power supply failure occurs in an energization system, corresponding semiconductor switch 15A or 15B provided on the sub power supply path for supplying an emergency power supply to the corresponding energization system in an on-state.

ECU 102b improves the reliability of the motor drive control without increasing the number of existing sensors, as is the case with ECU 102. In addition, ECU 102b provides the following advantageous effect. That is, ECU 102b is configured such that, when a sensor power supply failure occurs in an energization system, an emergency power supply is automatically supplied to the energization system from the other energization system without using the control circuit in the energization system. Thus, since first control circuit 13A and second control circuit 13B do not need to determine whether a sensor power supply failure has occurred, processing load on first control circuit 13A and second control circuit 13B is reduced.

Fourth Example

Figure 6:
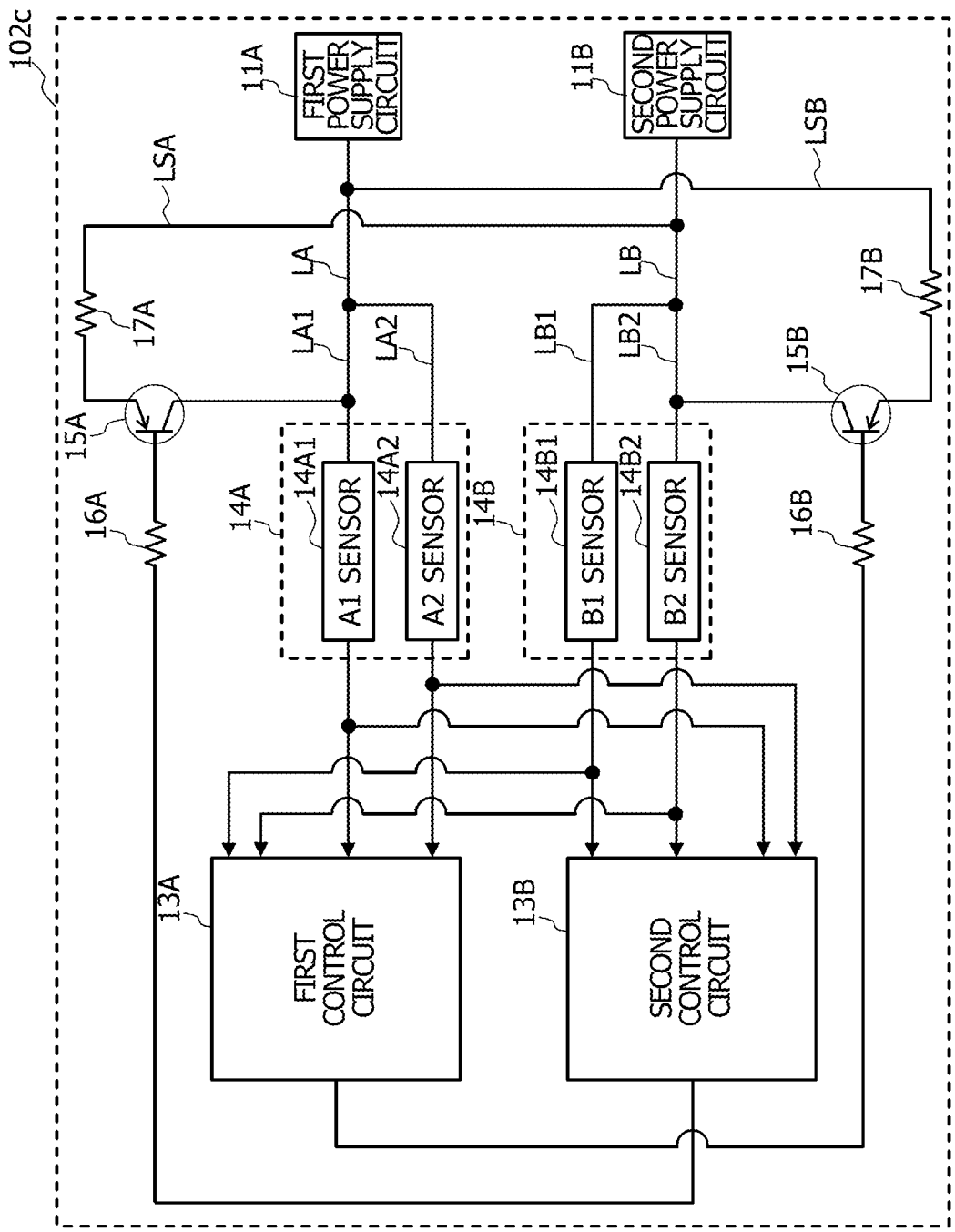
FIG. 6 illustrates details of a main part of an internal configuration example of a motor drive control apparatus according to a fourth example.

FIG. 6 illustrates details of a main part of an internal configuration of an ECU 102c according to a fourth example.

In ECU 102, first control circuit 13A can detect whether the two rotor rotation angles detected based on the output signals of the two rotation angle sensors of A1 sensor 14A1 and A2 sensor 14A deviate from each other. If the two rotor rotation angles deviate from each other, first control circuit 13A can detect that an abnormality has occurred in one of A1 sensor 14A1 and A2 sensor 14A2. However, since first control circuit 13A detects only two rotor rotation angles, first control circuit 13A cannot determine which of the two rotor rotation angles is abnormal by majority decision. Thus, it is difficult to determine the abnormal rotation angle sensor. It is also difficult for second control circuit 13B to determine which one of B1 sensor 14B1 and B2 sensor 14B2 is abnormal.

To allow the control circuit in the individual energization system to determine an abnormal rotation angle sensor, three or more rotation angle sensors may be provided in the individual energization system. In this way, when one of the three rotor rotation angles in an energization system deviates from the other two rotor rotation angles, the corresponding control circuit can determine, by majority decision, that an abnormality has occurred in the rotation angle sensor outputting the output signal used for the detection of the deviated rotor rotation angle. However, use of more rotation angle sensors in the individual energization system not only increases the cost but also requires more space for these sensors and increases the circuit size.

To solve this problem, ECU 102c has the following configuration to achieve a sensor abnormality determination function of enabling the control circuit in the individual energization system to determine an abnormal rotation angle sensor without increasing the number of existing rotation angle sensors. That is, ECU 102c is configured such that the output signals of the two rotation angle sensors in each energization system are input to the control circuit in the other energization system. Specifically, in ECU 102c, the output signals of the two rotation angle sensors of A1 sensor 14A1 and A2 sensor 14A2 are input not only to first control circuit 13A but also to second control circuit 13B. In addition, in ECU 102c, the output signals of the two rotation angle sensors of B1 sensor 14B1 and B2 sensor 14B2 are input not only to second control circuit 13B but also to first control circuit 13A.

Next, each of first control circuit 13A and second control circuit 13B detects rotation angles based on the output signal of A1 sensor 14A1, the output signal of A2 sensor 14A2, the output signal of B1 sensor 14B1, and the output signal of B2 sensor 14B2. That is, each of first control circuit 13A and second control circuit 13B detects four rotor rotation angles.

If one of the four detected rotor rotation angles deviates from the other three rotor rotation angles, each of first control circuit 13A and second control circuit 13B operates as follows according to majority decision. That is, each of first control circuit 13A and second control circuit 13B determines that the rotation angle sensor outputting the output signal used for the detection of the deviated rotor rotation angle is abnormal. Examples of the abnormality of the rotation angle sensor include a malfunction of the rotation angle sensor itself, a malfunction of the corresponding power supply circuit, and a sensor power supply failure such as a disconnection or a short circuit of the corresponding sensor power supply path.

After determining the single abnormal rotation angle sensor, each of first control circuit 13A and second control circuit 13B continues to detect the three rotation angles based on the three output signals of the three remaining rotation angle sensors. When one of the three rotation angles deviates from the other two rotation angles, each of first control circuit 13A and second control circuit 13B operates as follows according to majority decision. That is, each of first control circuit 13A and second control circuit 13B determines that the rotation angle sensor outputting the output signal used for the detection of the deviated rotation angle is abnormal.

After determining the two abnormal rotation angle sensors, each of first control circuit 13A and second control circuit 13B continues to detect the two rotation angles based on the two output signals of the two remaining rotation angle sensors. However, if these two rotation angles deviate from each other, it is difficult for first control circuit 13A and second control circuit 13B to determine which one of the two rotation angle sensors is abnormal according to majority decision. In this case, each of first control circuit 13A and second control circuit 13B determines that either one of the two rotation angle sensors is abnormal.

Thus, each of first control circuit 13A and second control circuit 13B can determine which one of the rotation angle sensors is abnormal until two of the four rotation angle sensors become abnormal and can continue the electrical control based on the output signals of the normal rotation angle sensors at least until three of the four rotation angle sensors become abnormal.

With the above configuration of ECU 102c, the output signals of the two rotation angle sensors in each energization system are input to the control circuit in the other energization system. Instead of this configuration, the output signal of a single rotation angle sensor in each energization system may be input to the control circuit in the other energization system. In this case, the control circuit in each energization system can determine which one of the three rotation angle sensors is abnormal. This is a sensor abnormality determination function equivalent to a case in which three rotation angle sensors that output signals to the control circuit in the individual energization system are simply used. Thus, until abnormalities occur in two rotation angle sensors, the control circuit in the individual energization system can continue the electrical control based on the output signals of the normal rotation angle sensors.

If first control circuit 13A determines that one of B1 sensor 14B1 and B2 sensor 14B2 is an abnormal rotation angle sensor, first control circuit 13A performs on-control of second semiconductor switch 15B. If second control circuit 13B determines that one of A1 sensor 14A1 and A2 sensor 14A2 is an abnormal rotation angle sensor, second control circuit 13B performs on-control of first semiconductor switch 15A.

The reason why first control circuit 13A, not second control circuit 13B, performs on-control of second semiconductor switch 15B when first control circuit 13A determines that one of B1 sensor 14B1 and B2 sensor 14B2 is an abnormal rotation angle sensor will be described below. That is, when one of B1 sensor 14B1 and B2 sensor 14B2 is abnormal, there is a possibility that an abnormality has also occurred in the power supplied to second control circuit 13B due to the sensor power supply failure in the second energization system and that second control circuit 13B has also stopped functioning. Even in such a case, the present configuration enables first control circuit 13A to determine the abnormal rotation angle sensor in the second energization system and to continue the electrical control by using the normal rotation angle sensors. For the same reason, second control circuit 13B, not first control circuit 13A, performs on-control of first semiconductor switch 15A when second control circuit 13B determines that one of A1 sensor 14A1 and A2 sensor 14A2 is an abnormal rotation angle sensor.

ECU 102c has not only the same emergency power supply function as ECU 102 but also the sensor abnormality determination function. That is, in ECU 102c, since at least one of the output signals of the rotation angle sensors in each energization system is input to the control circuit in the other energization system, the control circuit in each energization system can determine an abnormal rotation angle sensor without increasing the number of existing rotation angle sensors. In this way, the control circuit in each energization system can continue its electrical control based on the output signals of the normal rotation angle sensors. Thus, ECU 102c can further improve the reliability of the motor drive control in each energization system, without increasing the number of existing sensors.

The above configuration of ECU 102c enables the control circuit in each energization system to determine an abnormal rotation angle sensor based on the rotor rotation angles detected from the output signals of the rotation angle sensors. However, while the control circuit in each energization system can determine an abnormal rotation angle sensor, it is difficult for the control circuit to determine whether the cause of the abnormality is a sensor power supply failure or a malfunction of the rotation angle sensor itself. Thus, although the cause of the abnormality is a malfunction of the rotation angle sensor itself, an emergency power supply could be supplied from the other energization system. Thus, first control circuit 13A may be connected to second monitoring circuit 18B described above, and the output signal of second monitoring circuit 18B may be input to first control circuit 13A. In addition, second control circuit 13B may be connected to first monitoring circuit 18A as described above, and the output signal of first monitoring circuit 18A may be input to second control circuit 13B. In this way, first control circuit 13A can determine whether a sensor power supply failure has occurred in the second energization system, based on the voltage value of the sensor power supply path in the second energization system. Likewise, second control circuit 13B can determine a sensor power supply failure has occurred in the first energization system, based on the voltage value of the sensor power supply path in the first energization system.

If an abnormality occurs in the power supplied to the control circuit in an energization system already experiencing a sensor power supply failure, this control circuit could stop functioning. When the probability of this is relatively low, ECU 102c may be configured as follows. That is, when first control circuit 13A determines that one of A1 sensor 14A1 and A2 sensor 14A2 is an abnormal rotation angle sensor, first control circuit 13A may perform on-control of first semiconductor switch 15A. In addition, when second control circuit 13B determines that one of B1 sensor 14B1 and B2 sensor 14B2 is an abnormal rotation angle sensor, second control circuit 13B may perform on-control of second semiconductor switch 15B. Alternatively, if ECU 102c includes first monitoring circuit 18A and second monitoring circuit 18B as described above, first control circuit 13A may receive the output signal of first monitoring circuit 18A and second control circuit 13B may receive the output signal of second monitoring circuit 18B.

Fifth Example

Figure 7:
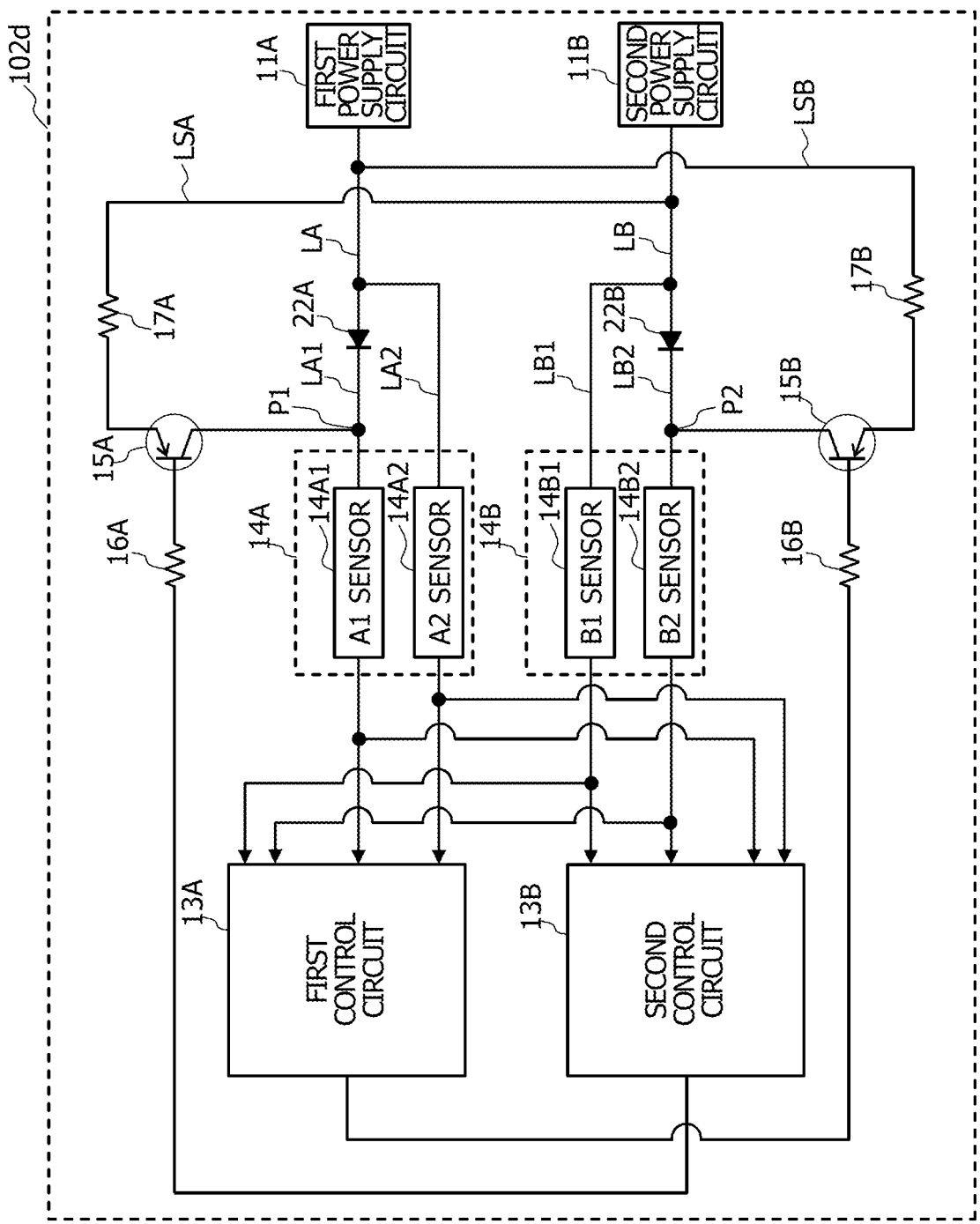
FIG. 7 illustrates details of a main part according to a first variation of the fourth example.
Figure 8:
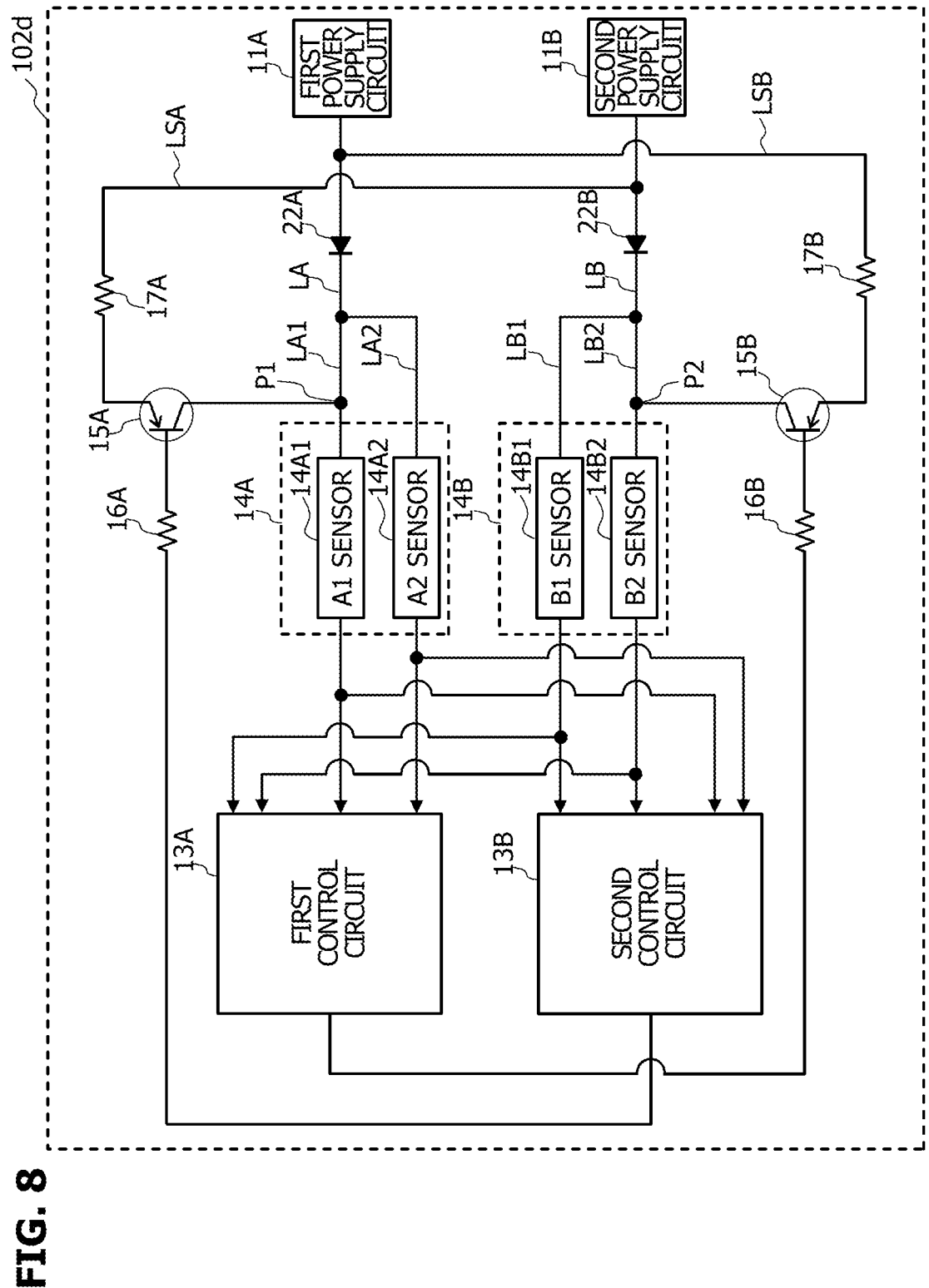
FIG. 8 illustrates details of a main part according to a second variation of the fourth example.
Figure 9:
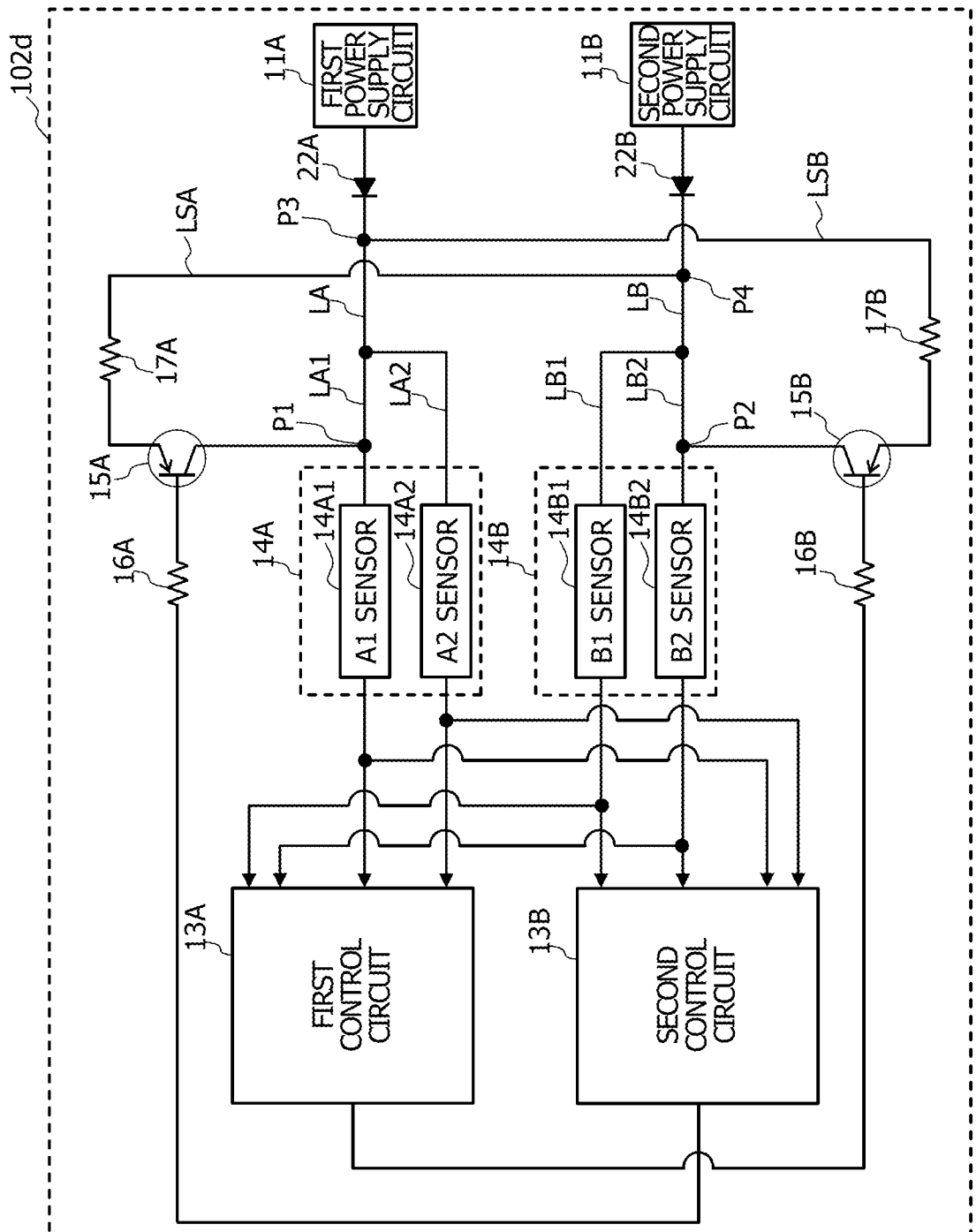
FIG. 9 illustrates details of a main part of an internal configuration example of a motor drive control apparatus according to a fifth example.

FIGS. 7 to 9 each illustrate details of a main part of an internal configuration of an ECU 102d according to a fifth example.

In the present example, what is different from the fourth example will mainly be described, and description relating to the fourth example will be applied to the other part of the fifth example, as long as there is no conflict. Thus, the same components as those according to the fourth example will be denoted by the same reference characters, and description thereof will be omitted or simplified. The same applies to the example described below.

In ECU 102c, if a sensor power supply failure occurs in one energization system, it is assumed that an abnormality, such as a ground fault or a short circuit, has occurred at a point upstream (in the direction of the corresponding power supply circuit) of the connection point between the corresponding sub power supply path for supplying an emergency power supply to the corresponding sensor power supply path in this energization system and the corresponding sensor power supply path. In this case, the emergency power supply current that has flowed to the sensor power supply path in the energization system in which the sensor power supply failure has occurred could flow to a portion other than the rotation angle sensors, to which the emergency power supply needs to be supplied, via the location of the occurrence of the abnormality. Thus, ECU 102d includes a backflow prevention mechanism provided on the sensor power supply path, to prevent the emergency power supply current from flowing backward to the power supply circuit from the above connection point. While a diode, a P-channel metal-oxide-semiconductor field-effect transistor (MOSFET), or the like may be used as the backflow prevention mechanism, a different element other than the above examples may be used as the backflow prevention mechanism.

FIG. 7 illustrates an example of the locations of the backflow prevention mechanisms. First sub power supply path LSA is connected to A1 branch path LA1 near A1 sensor 14A1, and this connection point will be referred to as a first supply destination connection point P1. In addition, second sub power supply path LSB is connected to B2 branch path LB2 near B2 sensor 14B2, and this connection point will be referred to as a second supply destination connection point P2. Each energization system includes a diode as a backflow prevention mechanism as described above. In the first energization system, a first backflow prevention diode 22A, of which the forward direction matches the direction from first power supply circuit 11A to A1 sensor 14A1, is provided at a point on A1 branch path LA1, the point being upstream of first supply destination connection point P1 (in the direction of first power supply circuit 11A). In addition, in the second energization system, a second backflow prevention diode 22B, of which the forward direction matches the direction from second power supply circuit 11B to B2 sensor 14B2, is provided at a point on B2 branch path LB2, the point being upstream of second supply destination connection point P2 (in the direction of second power supply circuit 11B).

When a sensor power supply failure occurs in the first energization system and an emergency power supply is supplied from the second energization system to the first energization system via first sub power supply path LSA, the emergency power supply current flows from first supply destination connection point P1 to A1 sensor 14A1 by the rectification of first backflow prevention diode 22A. That is, on the sensor power supply path in the first energization system, the flow range of the emergency power supply current is virtually limited to the section from first supply destination connection point P1 to A1 sensor 14A1. That is, the emergency power supply current flows within the narrowest possible range.

In addition, when a sensor power supply failure occurs in the second energization system and an emergency power supply is supplied from the first energization system to the second energization system via second sub power supply path LSB, the emergency power supply current flows from second supply destination connection point P2 to B2 sensor 14B2 by the rectification of second backflow prevention diode 22B. That is, on the sensor power supply path in the second energization system, the flow range of the emergency power supply current is virtually limited to the section from second supply destination connection point P2 to B2 sensor 14B2. That is, the emergency power supply current flows within the narrowest possible range.

Thus, ECU 102c can reduce the probability that an emergency power supply current flows to a portion other than the rotation angle sensors, to which the emergency power supply needs to be supplied, via the location of the occurrence of an abnormality such as a ground fault or a short circuit, the location being upstream of first supply destination connection point P1 or second supply destination connection point P2.

When a sensor power supply failure occurs in the first energization system, while first backflow prevention diode 22A prevents the provision of the emergency power supply to A2 sensor 14A2, the emergency power supply is supplied to A1 sensor 14A1. That is, the three rotation angle sensors are provided with a power supply. When a sensor power supply failure occurs in the second energization system, while second backflow prevention diode 22B prevents the provision of the emergency power supply to B1 sensor 14B1, the emergency power supply is supplied to B2 sensor 14B2. That is, the three rotation angle sensors are provided with a power supply. Thus, even when a sensor power supply failure occurs in any one of first energization system and second energization system, the control circuit in the individual energization system can determine the abnormal rotation angle sensor based on a majority of the three rotation angle sensors and can continue to perform the drive control in the corresponding energization system. This is a sensor abnormality determination function equivalent to a case in which three rotation angle sensors that output output signals to the control circuit in the individual energization system are simply used.

Instead of the above configuration, the following configuration may be adopted, to provide both of the two rotation angle sensors with an emergency power supply while flowing the emergency power supply current within the narrowest possible range. That is, first sub power supply path LSA may be branched into two paths, which are connected to the first energization system. In this case, one of the paths is connected to A1 branch path LA1, and the other path is connected to A2 branch path LA2. In addition, a backflow prevention mechanism is provided upstream of each of these connection points (in the direction of first power supply circuit 11A). In addition, second sub power supply path LSB may be branched into two paths, which are connected to the second energization system. In this case, one of the paths is connected to B1 branch path LB1, and the other path is connected to B2 branch path LB2. In addition, a backflow prevention mechanism is provided upstream of each of these connection points (in the direction of second power supply circuit 11B).

FIG. 8 illustrates a first variation of the locations of the backflow prevention mechanisms. In the first energization system, first backflow prevention diode 22A, of which the forward direction matches the direction from first power supply circuit 11A to A1 sensor 14A1 and A2 sensor 14A2, is provided on first shared power supply path LA. In the second energization system, second backflow prevention diode 22B, of which the forward direction matches the direction from second power supply circuit 11B to B1 sensor 14B1 and B2 sensor 14B2, is provided on second shared power supply path LB.

When a sensor power supply failure occurs in the first energization system and an emergency power supply is supplied from the second energization system to the first energization system via first sub power supply path LSA, the emergency power supply current flows to A1 sensor 14A1 and A2 sensor 14A2 by the rectification of first backflow prevention diode 22A. That is, on the sensor power supply path in the first energization system, the flow range of the emergency power supply current is virtually limited to the section from first backflow prevention diode 22A to A1 sensor 14A1 and the section from first backflow prevention diode 22A to A2 sensor 14A2.

In addition, when a sensor power supply failure occurs in the second energization system and an emergency power supply is supplied from the first energization system to the second energization system via second sub power supply path LSB, the emergency power supply current flows to B1 sensor 14B1 and B2 sensor 14B2 by the rectification of second backflow prevention diode 22B. That is, on the sensor power supply path in the second energization system, the flow range of the emergency power supply current is virtually limited to the section from second backflow prevention diode 22B to B1 sensor 14B1 and the section from second backflow prevention diode 22B to B2 sensor 14B2.

The configuration according to the first variation described above can provide both of the two rotation angle sensors in each energization system with an emergency power supply while limiting the flow range of the emergency power supply current on the sensor power supply path in each energization system. In this way, when a sensor power supply failure occurs in any one of the first energization system and the second energization system, the four rotation angle sensors are provided with a power supply, and abnormal rotation angle sensors can be determined until two of the four rotation angle sensors are abnormal. Thus, the continuity of the motor drive control in the individual energization system can be improved.

FIG. 9 illustrates a second variation of the locations of the backflow prevention mechanisms. First sub power supply path LSA is connected to second shared power supply path LB, and this connection point will be referred to as a first supply source connection point P4. In addition, second sub power supply path LSB is connected to first shared power supply path LA, and this connection point will be referred to as a second supply source connection point P3. First backflow prevention diode 22A in the first energization system is provided on a point on first shared power supply path LA, the point being upstream of first supply source connection point P4 (in the direction of first power supply circuit 11A). The forward direction of first backflow prevention diode 22A matches the direction from first power supply circuit 11A to A1 sensor 14A1 and A2 sensor 14A2. Second backflow prevention diode 22B in the second energization system is provided on a point on second shared power supply path LB, the point being upstream of second supply source connection point P3 (in the direction of second power supply circuit 11B). The forward direction of second backflow prevention diode 22B matches the direction from second power supply circuit 11B to B1 sensor 14B1 and B2 sensor 14B2.

The configuration according to the second variation described above can also improve the continuity of the motor drive control in the individual energization system, as is the case with the configuration according to the first variation.

Sixth Example

Figure 10:
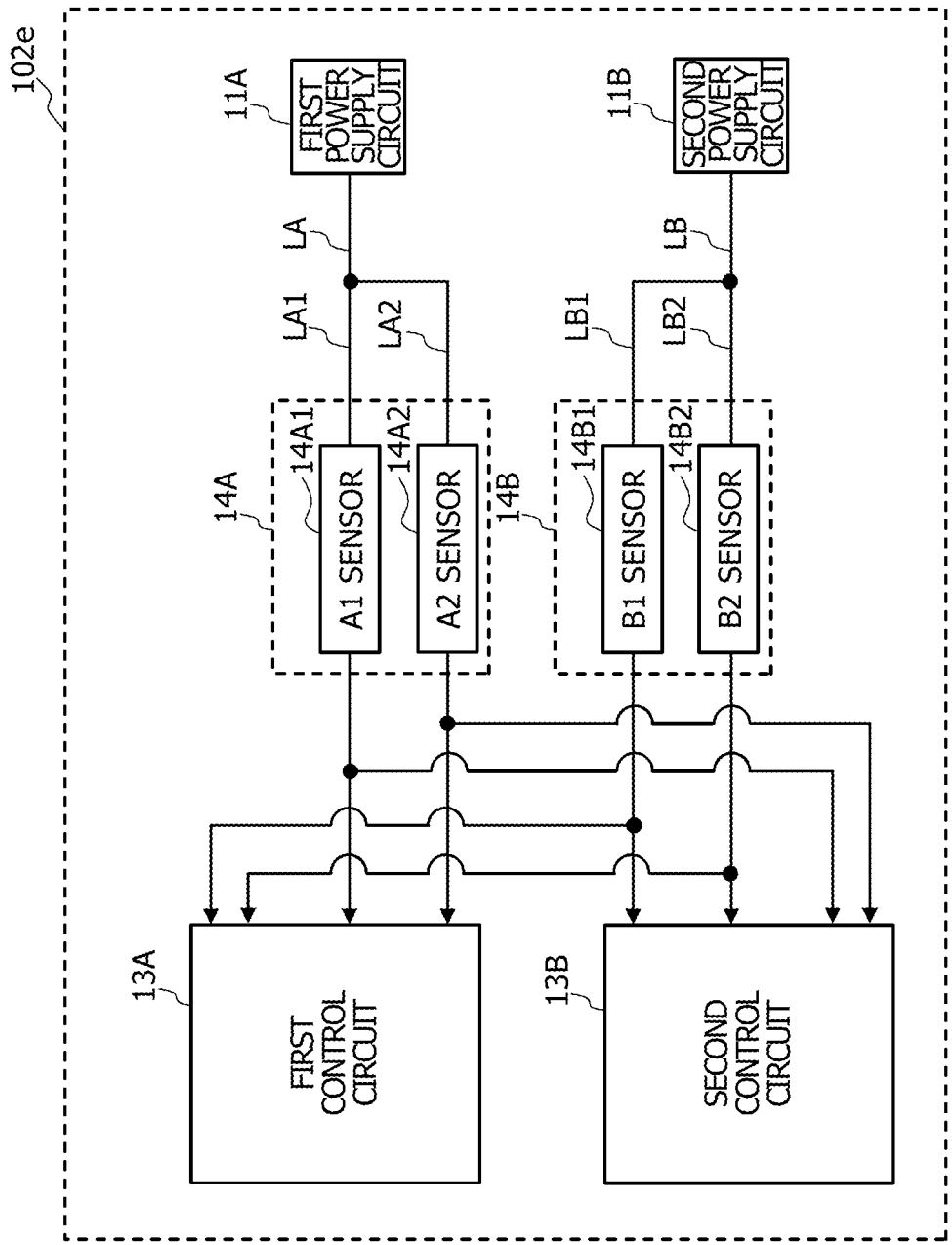
FIG. 10 illustrates details of a main part of an internal configuration example of a motor drive control apparatus according to a sixth example.

FIG. 10 illustrates details of a main part of an internal configuration of an ECU 102e according to a sixth example.

While ECU 102c has both the emergency power supply function and the sensor abnormality determination function, the emergency power supply function is omitted in ECU 102e. In the case of ECU 102e configured in this way, since at least one of the output signals of the rotation angle sensors in each energization system is input to the control circuit in the other energization system, the control circuit in the individual energization system can determine an abnormal rotation angle sensor, without increasing the number of existing rotation angle sensors. In this way, the control circuit in the individual energization system can continue its electrical control based on the output signals of the normal rotation angle sensors. Thus, ECU 102e can improve the reliability of the drive control in the individual energization system, without increasing the number of existing sensors.

Although the present invention has thus been described in detail with reference to preferable examples, the individual technical concepts described above can be appropriately combined and used as long as there is no conflict. In addition, it is clear that those skilled in the art can adopt various types of modified forms, for example, as described below, based on the basic technical concept and teaching of the present invention.

In the above first to sixth examples, electric steering system 100 includes two energization systems. Alternatively, electric steering system 100 may be configured to include three or more energization systems and to perform a limp home operation in which, when one of the energization systems becomes abnormal, the drive control is continued with the other normal energization systems.

For example, when electric steering system 100 includes three energization systems, six sub power supply paths may be configured such that each energization system can supply an emergency power supply to the other two energization systems. In this case, the control circuit in each energization system detects whether a sensor power supply failure has occurred in any one of the other two energization systems. For example, the control circuit in each energization system detects occurrence of a sensor power supply failure based on at least one of the output signals of the rotation angle sensors in the other two energization systems and the output signals of the monitoring circuits that monitor the voltages of the sensor power supply paths in the other two energization systems. The control circuit in an energization system performs on-control of the semiconductor switch provided on the sub power supply path connected to the sensor power supply path in an abnormal energization system in which a sensor power supply failure has occurred and provides the abnormal energization system with an emergency power supply.

Instead of this, to receive an emergency power supply from one of the other two energization systems based on the detection of the sensor power supply failure, the control circuit in the energization system in which the sensor power supply failure has occurred performs on-control of one of the semiconductor switches provided on the sub power supply paths connected to the other two energization systems. It is preferable that, if the output signals of the rotation angle sensors are still stopped even after the on-control of one of the semiconductor switches, the control circuit in the energization system in which the sensor power supply failure has occurred performs on-control of the other semiconductor switch.

In addition, when electric steering system 100 has three energization systems, three sub power supply paths may be configured as a first sub power supply path for supplying an emergency power supply from the first energization system to the second energization system, a second sub power supply path for supplying an emergency power supply from the second energization system to the third energization system, and a third sub power supply path for supplying an emergency power supply from the third energization system to the first energization system.

In short, any electric steering system including a plurality of energization systems, each of which has a sensor power supply path connected to the sensor power supply path in at least one of the other energization systems and receiving an emergency power supply therefrom, is applicable.

Figure 11:
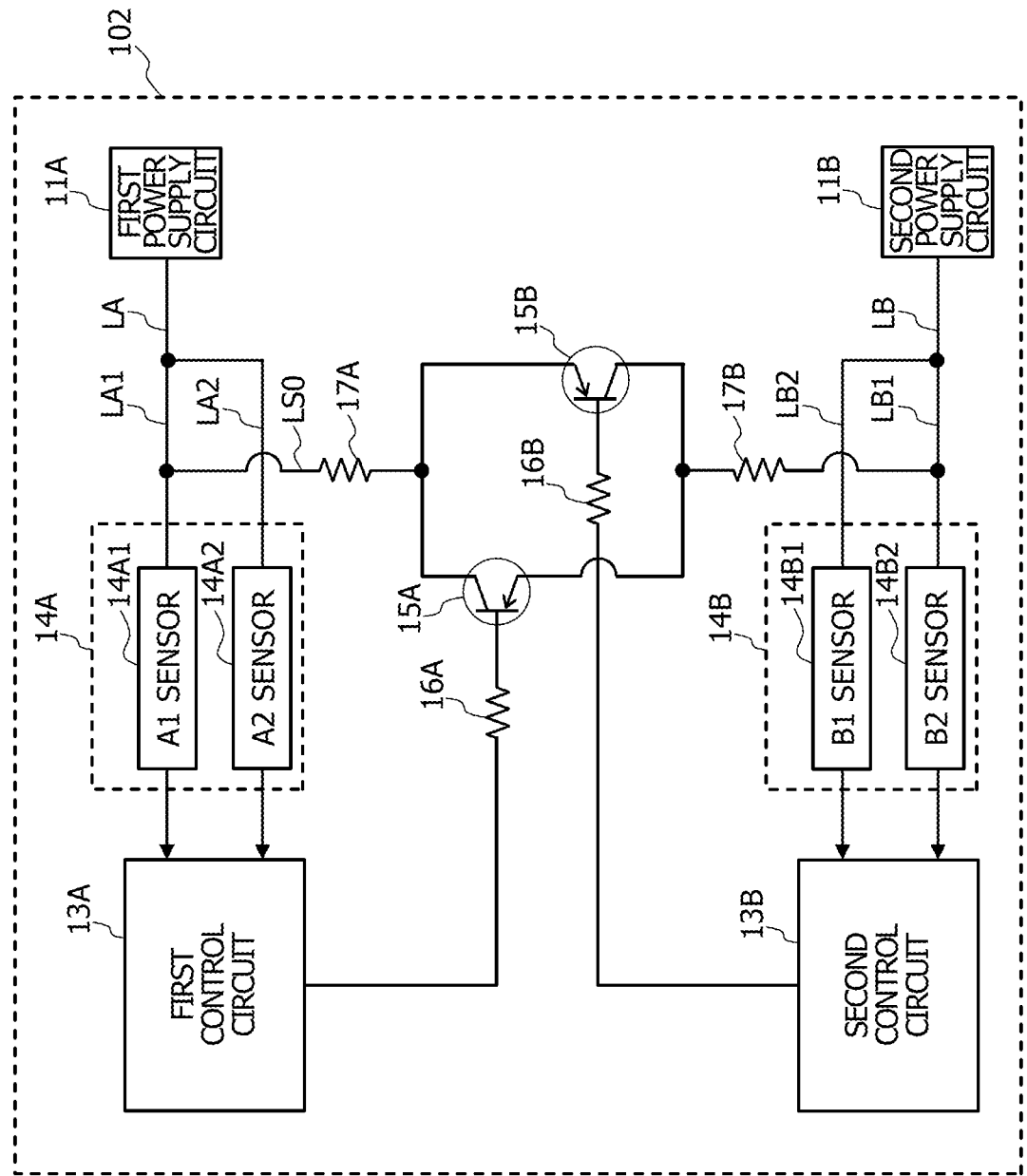
FIG. 11 illustrates details of a main part of an application example of a shared sub power supply path in FIG. 3.

In the examples excepting the above third and sixth examples, first sub power supply path LSA and second sub power supply path LSB may be integrated into a single sub power supply path. For example, first sub power supply path LSA and second sub power supply path LSB in ECU 102 may be integrated into a single shared sub power supply path LS0, as illustrated in FIG. 11. In this case, shared sub power supply path LS0 connects the sensor power supply path in the first energization system (preferably, near A1 sensor 14A1 or A2 sensor 14A2) and the sensor power supply path in the second energization system (preferably, near B1 sensor 14B1 or B2 sensor 14B2). Shared sub power supply path LS0 includes first semiconductor switch 15A and second semiconductor switch 15B connected in parallel to each other and includes at least one of a first current-limiting resistor 17A and a second current-limiting resistor 17B. ECUs 102a, 102c, and 102d may include shared sub power supply path LS0 in the same way. The configuration including shared sub power supply path LS0 can also achieve the same emergency power supply function as that of the configuration including first sub power supply path LSA and second sub power supply path LSB.

When electric steering system 100 includes three energization systems, if shared sub power supply path LS0 is applied thereto, three sub power supply paths may be configured as follows. That is, a first shared sub power supply path for mutually supplying an emergency power supply between the first energization system and the second energization system, a second shared sub power supply path for mutually supplying an emergency power supply between the second energization system and the third energization system, and a third shared sub power supply path for mutually supplying an emergency power supply between the third energization system and the first energization system may be configured. An electric steering system having four or more energization systems can be configured in the same way.

In the above first to sixth examples, while each of first rotation angle sensor group 14A and second rotation angle sensor group 14B constituting rotation angle detection unit 14 includes two rotation angle sensors, each of first rotation angle sensor group 14A and second rotation angle sensor group 14B may include three or more rotation angle sensors. In this case, ECUs 102c, 102d, and 102e are each configured such that the control circuit in each energization system receives at least one of the output signals of the three or more rotation angle sensors in the other energization system different from this energization system.

While a plurality of rotation angle sensors is connected to the control circuit in each energization system, in place of or in addition to these rotation angle sensors, other sensors for detecting physical amounts relating to the drive control of motor 101 may be connected to the control circuit in each energization system. Examples of the physical amounts relating to the drive control of motor 101 include, in addition to the rotor rotation angle, the steering torque, the steering angle, and the vehicle velocity for calculating the target torque relating to the drive control of motor 101, for example. Thus, the other sensors for detecting the physical amounts relating to the drive control of motor 101 correspond to steering torque sensor 104, steering angle sensor 105, and vehicle velocity sensor 106.

In the above examples, electric steering system 100 has been described as an application example of the motor drive control apparatus. However, the present invention is applicable to any system including an apparatus mounted in vehicle 1000 (in-vehicle apparatus) having a redundant configuration of motor energization systems.

REFERENCE SYMBOL LIST 11A first power supply circuit
11B second power supply circuit
13A first control circuit
13B second control circuit
14 rotation angle detection unit
14A1 A1 sensor
14A2 A2 sensor
14B1 B1 sensor
14B2 B2 sensor
15A first semiconductor switch
15B second semiconductor switch
17A first current-limiting resistor
17B second current-limiting resistor
18A first monitoring circuit
18B second monitoring circuit
22A first backflow prevention diode
22B second backflow prevention diode
101 motor
101A first winding set
101B second winding set
102, 102a, 102b, 102c, 102d, and 102e ECU
102A first energization controller
102B second energization controller
104 steering torque sensor
105 steering angle sensor
106 vehicle velocity sensor
LA first shared power supply path
LA1 A1 branch path
LA2 A2 branch path
LB second shared power supply path
LB1 B1 branch path
LB2 B2 branch path
LSA first sub power supply path
LSB second sub power supply path

The invention claimed is:
1. A motor drive control apparatus including energization systems for energizing a motor having a plurality of inde- pendent winding sets, with the energization systems corresponding one-to-one to the winding sets, the motor drive control apparatus comprising:
- a plurality of sensors which is provided for each of the energization systems and which detects common physical amounts relating to driving control of the motor;
- a controller which is provided for each of the energization systems and which controls energization of the corresponding winding set based on output signals of the corresponding sensors;
- a power supply path which is provided for each of the energization systems and which supplies power to the corresponding sensors;
- a plurality of sub power supply paths, each of which mutually connects the power supply paths of the energization systems; and
- a semiconductor switch which is provided for each of the sub power supply paths and which, between two different energization systems, when a first energization system, which is one of the two different energization systems, exhibits an abnormality indicating a drop in a voltage of the power supply supplied to the corresponding sensors, electrically connects the power supply path in the first energization system with the power supply path in a second energization system, which is the other one of the two different energization systems.

2. The motor drive control apparatus according to claim 1, wherein, when the controller in the first energization system detects occurrence of the abnormality in the first energization system based on the output signals of the corresponding sensors in the first energization system, the controller electrically connects the power supply path in the first energization system with the power supply path in the second energization system by controlling the semiconductor switch.

3. The motor drive control apparatus according to claim 1, further comprising:
- a monitoring circuit which is provided for each of the energization systems and which monitors a voltage of the corresponding power supply path,
- wherein, when the controller in the first energization system detects occurrence of the abnormality in the first energization system based on an output signal of the corresponding monitoring circuit, the controller electrically connects the power supply path in the first energization system with the power supply path in the second energization system by controlling the semiconductor switch.

4. The motor drive control apparatus according to claim 1, wherein at least one of the output signals of the sensors in the second energization system is input to the controller in the first energization system, and
wherein, when the controller in the first energization system detects occurrence of the abnormality in the second energization system based on the at least one of the output signals of the sensors in the second energization system, the controller electrically connects the power supply path in the first energization system with the power supply path in the second energization system by controlling the semiconductor switch.

5. The motor drive control apparatus according to claim 1, wherein the sub power supply path includes a current-limiting resistor which limits a current flowing from the second energization system to the first energization system when the power supply path in the first energization system and the power supply path in the second energization system are electrically connected to each other.

6. The motor drive control apparatus according to claim 1, wherein the power supply path in each of the energization systems includes a single common power supply path which is connected to a power supply circuit unique to the corresponding energization system and branch paths which are branched from the common power supply path and which are connected one-to-one to the corresponding sensors, and
wherein the sub power supply paths constitute a first sub power supply path which connects one of the branch paths in the first energization system and the common power supply path in the second energization system and a second sub power supply path which connects at least one of the branch paths in the second energization system with the common power supply path in the first energization system.

7. The motor drive control apparatus according to claim 6, further comprising a backflow prevention mechanism provided on the branch paths in the first energization system and between the corresponding power supply circuit and a connection point of the first sub power supply path to the at least one of the branch paths, to prevent a current that flows from the second energization system to the first energization system via the first sub power supply path from flowing backward to the corresponding power supply circuit.

8. The motor drive control apparatus according to claim 6, further comprising a backflow prevention mechanism provided on the common power supply path in the first energization system and between the corresponding sensors and a connection point of the second sub power supply path to the common power supply path in the first energization system, to prevent a current that flows from the second energization system to the first energization system via the first sub power supply path from flowing backward to the corresponding power supply circuit.

9. The motor drive control apparatus according to claim 6, further comprising a backflow prevention mechanism provided on the common power supply path in the first energization system and between the corresponding power supply circuit and a connection point of the common power supply path to the second sub power supply path, to prevent a current that flows from the second energization system to the first energization system via the first sub power supply path from flowing backward to the corresponding power supply circuit.

10. The motor drive control apparatus according to claim 1, further comprising a self-holding circuit which causes, when the abnormality occurs in the first energization system, the semiconductor switch to maintain the electrical connection between the first energization system and the second energization system, without relying on the controller.

11. The motor drive control apparatus according to claim 1,
wherein, as the sub power supply paths, a single sub power supply path is provided between the first energization system and the second energization system, and
wherein, on the sub power supply path, a first semiconductor switch controllable by the controller in the first energization system and a second semiconductor switch controllable by the controller in the second energization system are provided in parallel to each other.

12. A motor drive control apparatus including energization systems for energizing a motor having a plurality of independent winding sets, with the energization systems corresponding one-to-one to the winding sets, the motor drive control apparatus comprising:
- a plurality of sensors which is provided for each of the energization systems and which detects common physical amounts relating to driving control of the motor; and
- a controller which is provided for each of the energization systems and which controls energization of the corresponding winding set based on output signals of the corresponding sensors,
- wherein the controller in one of the energization systems receives at least one output signal of the sensors in another energization system different from the one energization system.

* * * * *